United States Patent
Han et al.

(10) Patent No.: US 11,791,854 B2
(45) Date of Patent: *Oct. 17, 2023

(54) CIRCUITS FOR INTERMEDIATE-FREQUENCY-FILTERLESS, DOUBLE-CONVERSION RECEIVERS

(71) Applicant: The Trustees of Columbia University in the City of New York, New York, NY (US)

(72) Inventors: Guoxiang Han, San Jose, CA (US); Peter R. Kinget, Summit, NJ (US); Tanbir Haque, Jackson Heights, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,622

(22) Filed: Dec. 23, 2021

(65) Prior Publication Data

US 2022/0123772 A1    Apr. 21, 2022

Related U.S. Application Data

(63) Continuation-in-part of application No. 17/176,349, filed on Feb. 16, 2021.

(Continued)

(51) Int. Cl.
*H04B 1/16* (2006.01)
*H04B 1/12* (2006.01)

(52) U.S. Cl.
CPC .............. *H04B 1/16* (2013.01); *H04B 1/12* (2013.01)

(58) Field of Classification Search
CPC ... H04B 1/12; H04B 1/18; H04B 1/30; H04B 2001/307; H04L 25/08

See application file for complete search history.

(56) References Cited

U.S. PATENT DOCUMENTS

| 6,335,952 B1* | 1/2002 | Lee | H03D 7/1441 |
| | | | 375/327 |
| 2004/0151109 A1* | 8/2004 | Batra | H04L 1/0071 |
| | | | 370/208 |

(Continued)

OTHER PUBLICATIONS

Abidi, A.A., "Direct-Conversion Radio Transceivers for Digital Communications", in IEEE J. Solid-State Circuits, vol. 30, No. 12, Dec. 1995, pp. 1399-1410.

(Continued)

*Primary Examiner* — Junpeng Chen
(74) *Attorney, Agent, or Firm* — Byrne Poh LLP

(57) ABSTRACT

Circuits for receivers including: N first mixers that each receive an input signal, are each clocked by a different phase of a first common clock frequency, and each provide an output; and for each N first mixer: a set of M second mixers, wherein each second mixer receives as an input the output of a same one of the N first mixers unique to the set, wherein each of M second mixer is clocked by a different phase of a second common clock frequency, and wherein each second mixer has an output; a set of M resistors having a first side and a second side, wherein the first side is connected to the output of a corresponding one of the set of M second mixers; and a set of M trans-impedance amplifiers that each having an input connected to the second side of a corresponding one of the resistors.

19 Claims, 26 Drawing Sheets

Related U.S. Application Data

(60) Provisional application No. 63/130,070, filed on Dec. 23, 2020, provisional application No. 63/130,070, filed on Dec. 23, 2020, provisional application No. 62/977,007, filed on Feb. 14, 2020.

(56) References Cited

U.S. PATENT DOCUMENTS

| | | | | |
|---|---|---|---|---|
| 2005/0070242 | A1* | 3/2005 | Davis | H03C 3/40 455/293 |
| 2012/0219080 | A1* | 8/2012 | Brunner | H04L 25/0222 375/261 |
| 2018/0287559 | A1* | 10/2018 | Zhu | H03H 7/38 |
| 2019/0207288 | A1* | 7/2019 | Zhu | H04B 1/18 |
| 2020/0274522 | A1* | 8/2020 | Karmaker | H03F 3/68 |

OTHER PUBLICATIONS

Andrews, C., et al., "Implications of Passive Mixer Transparency for Impedance Matching and Noise Figure in Passive Mixer-First Feceivers", in IEEE Trans. Circuits and Systems I, vol. 57, No. 12, Dec. 2010, pp. 3092-3103.

Cadence, "Spectre Circuit Simulation Tool", last accessed Mar. 13, 2023, pp. 1-5, available at: https://www.cadence.com.

Chen, R., et al., "Reconfigurable Receiver with Radio-Frequency Current-Mode Complex Signal Processing Supporting Carrier Aggregation", in IEEE Journal of Solid-State Circuits, vol. 50, No. 12, Dec. 2015, pp. 3032-3046.

Darabi, H., et al., "Noise in RF-CMOS Mixers: a simplephysical model", in IEEE J. Solid-State Circuits, vol. 35, No. 1, Jan. 2000, pp. 15-25.

Darvishi, M., et al., "Widely Tunable 4th Order Switched Gm-C band-pass Filter based on N-path Filters", in IEEE J. Solid-State Circuits, vol. 47, Dec. 2012, pp. 3105-3119.

Elmaghraby, A., et al., "A Double Bandpass N-path Filter for LTE Carrier Aggregation Receivers in 28nm CMOS", in WAMICON 2014, Jun. 2014, pp. 1-3.

Fabiano, I., et al., "SAW-less Analog Front-end Receivers for TDD and FDD", in IEEE J. Solid-State Circuits, vol. 48, No. 12, Dec. 2013, pp. 3067-3079.

Han, G., et al., "A 0.3-to-1.3GHz Multi-Branch Receiver with Modulated Mixer Clocks for Concurrent Dual-Carrier Reception and Rapid Compressive-Sampling Spectrum Scanning," in 2019 IEEE Radio Frequency Integrated Circuits Symposium (RFIC), Jun. 2019, pp. 95-98.

Kasri, R., et al., "A Digital Sine-Weighted Switched-Gm Mixer for Singleclock Power-Scalable Parallel Receivers", in 2017 IEEE CICC Conference, Apr. 30-May 3, 2017, pp. 1-4.

Klumperink, E.A.M., et al., "Software Defined Radio Receivers Exploiting Noise Cancelling: A tutorial review", in IEEE Communications Magazine, vol. 52, No. 10, Oct. 2014, pp. 111-117.

Mirzaei, A., et al., "Architectural Evolution of Integrated M-phase high-Q Bandpass Filters", in IEEE Trans. Circuits and Systems I, vol. 59, No. 1, Jan. 2012, pp. 52-65.

Murphy, D., et al., "A Blocker-Tolerant, Noise-Cancelling Receiver Suitable for Wideband Wireless Applications", in IEEE J. Solid-State Circuits, vol. 47, No. 12, Dec. 2012, pp. 2943-2963.

Murphy, D., et al., "A Noise-Cancelling Receiver Resilient to Large Harmonic Blockers", in IEEE J. Solid-State Circuits, vol. 50, No. 6, Jun. 2015, pp. 1336-1350.

Murphy, D., et al., "An LTV Analysis of the Frequency Translational Noise-Cancelling Receiver", in IEEE Trans. Circuits and Systems I, vol. 61, No. 1, Jan. 2014, pp. 266-279.

Notice of Allowance dated Mar. 14, 2023 in U.S. Appl. No. 17/176,349, pp. 1-20.

Pehlke, D.R., et al., "LTE-Advanced Pro RF Front-End Implementations to Meet Emerging Carrier Aggregation and DL MIMO Requirement", in IEEE Communications Magazine, vol. 55, no. 4, Apr. 14,2017, pp. 134-141.

Piazza, F., et al., "A 1.57GHz RF Front-End for Triple Conversion GPS Receiver", in IEEE J. Solid-State Circuits, vol. 33, No. 2, Feb. 1998, pp. 202-209.

Razavi, B., "Design Considerations for Direct-conversion Receivers", in IEEE Trans. Circuits and Systems II, vol. 44, No. 6, Jun. 1997, pp. 428-435.

Rice, S.O., "Mathematical Analysis of Random Noise," The Bell System Technical Journal, vol. 23, No. 3, Jan. 1945, pp. 282-332.

Stetzler, T.D., et al., "A 2.7-4.5V Single-Chip GSM Transceiver RF Integrated Circuit", in IEEE J. Solid-State Circuits, vol. 30, No. 12, Dec. 1995, pp. 1421-1429.

Sundstrom, L. et al., "Receiver for LTE Rel-11 and Beyond Supporting Non-Contiguous Carrier Aggregation", In IEEE International Solid-State Circuits Conference Digest of Technical Papers (ISSCC), Feb. 17, 2013, pp. 336-337.

Wu, H., et al., "A Harmonic-Selective Multi-Band Wireless Receiver with Digital Harmonic Rejection Calibration", in IEEE J. Solid-State Circuits, vol. 54, No. 3, Mar. 2019, pp. 796-807.

Xu, Y., et al., "A Blocker-Tolerant RF Front End with Harmonic-Rejecting N-path Filter", in IEEE J. Solid-State Circuits, vol. 53, No. 2, Feb. 2018, pp. 327-339.

Yang, D., et al., "Optimized Design of N-phase Passive Mixer-First Receivers in Wideband Operation", in IEEE Trans. Circuits and Systems I, vol. 62, No. 11, Nov. 2015, pp. 2759-2770.

Zhu, J., et al., "Frequency-Translational Quadrature-Hybrid Receivers for Very-Low-Noise, Frequency-Agile, Scalable Inter-Band Carrier Aggregation", in IEEE Journal of Solid-State Circuits, vol. 51, issue 12, Dec. 2016, pp. 3137-3151.

* cited by examiner

| Addr<4:0> | SRAM Table (In-Phase) MAG | POL | Addr<4:0> | SRAM Table (In-Phase) MAG | POL |
|---|---|---|---|---|---|
| 5'b00000 | 5'b11111 | 1'b1 | 5'b10000 | 5'b11111 | 1'b0 |
| 5'b00001 | 5'b11110 | 1'b1 | 5'b10001 | 5'b11110 | 1'b0 |
| 5'b00010 | 5'b11101 | 1'b1 | 5'b10010 | 5'b11101 | 1'b0 |
| 5'b00011 | 5'b11010 | 1'b1 | 5'b10011 | 5'b11010 | 1'b0 |
| 5'b00100 | 5'b10110 | 1'b1 | 5'b10100 | 5'b10110 | 1'b0 |
| 5'b00101 | 5'b10001 | 1'b1 | 5'b10101 | 5'b10001 | 1'b0 |
| 5'b00110 | 5'b01100 | 1'b1 | 5'b10110 | 5'b01100 | 1'b0 |
| 5'b00111 | 5'b00110 | 1'b1 | 5'b10111 | 5'b00110 | 1'b1 |
| 5'b01000 | 5'b00000 | 1'b0 | 5'b11000 | 5'b00000 | 1'b1 |
| 5'b01001 | 5'b00110 | 1'b0 | 5'b11001 | 5'b00110 | 1'b1 |
| 5'b01010 | 5'b01011 | 1'b0 | 5'b11010 | 5'b01011 | 1'b1 |
| 5'b01011 | 5'b10001 | 1'b0 | 5'b11011 | 5'b10001 | 1'b1 |
| 5'b01100 | 5'b10101 | 1'b0 | 5'b11100 | 5'b10101 | 1'b1 |
| 5'b01101 | 5'b11001 | 1'b0 | 5'b11101 | 5'b11001 | 1'b1 |
| 5'b01110 | 5'b11100 | 1'b0 | 5'b11110 | 5'b11100 | 1'b1 |
| 5'b01111 | 5'b11110 | 1'b0 | 5'b11111 | 5'b11110 | 1'b1 |

FIG. 10

| Addr<4:0> | SRAM Table (Quad-Phase) | | Addr<4:0> | SRAM Table (Quad-Phase) | |
|---|---|---|---|---|---|
| | MAG | POL | | MAG | POL |
| 5'b00000 | 5'b00000 | 1'b1 | 5'b10000 | 5'b00000 | 1'b0 |
| 5'b00001 | 5'b00110 | 1'b1 | 5'b10001 | 5'b00110 | 1'b0 |
| 5'b00010 | 5'b01100 | 1'b1 | 5'b10010 | 5'b01100 | 1'b0 |
| 5'b00011 | 5'b10001 | 1'b1 | 5'b10011 | 5'b10001 | 1'b0 |
| 5'b00100 | 5'b10110 | 1'b1 | 5'b10100 | 5'b10110 | 1'b0 |
| 5'b00101 | 5'b11010 | 1'b1 | 5'b10101 | 5'b11010 | 1'b0 |
| 5'b00110 | 5'b11101 | 1'b1 | 5'b10110 | 5'b11101 | 1'b0 |
| 5'b00111 | 5'b11110 | 1'b1 | 5'b10111 | 5'b11110 | 1'b0 |
| 5'b01000 | 5'b11111 | 1'b1 | 5'b11000 | 5'b11111 | 1'b0 |
| 5'b01001 | 5'b11110 | 1'b1 | 5'b11001 | 5'b11110 | 1'b0 |
| 5'b01010 | 5'b11101 | 1'b1 | 5'b11010 | 5'b11101 | 1'b0 |
| 5'b01011 | 5'b11010 | 1'b1 | 5'b11011 | 5'b11010 | 1'b0 |
| 5'b01100 | 5'b10110 | 1'b1 | 5'b11100 | 5'b10110 | 1'b0 |
| 5'b01101 | 5'b10001 | 1'b1 | 5'b11101 | 5'b10001 | 1'b0 |
| 5'b01110 | 5'b01100 | 1'b1 | 5'b11110 | 5'b01100 | 1'b0 |
| 5'b01111 | 5'b00110 | 1'b1 | 5'b11111 | 5'b00110 | 1'b0 |

FIG. 11

| # | Thermometer Logic Input | Thermometer Logic Output* | # | Thermometer Logic Input | Thermometer Logic Output* |
|---|---|---|---|---|---|
| 1 | 5'b00000 | 31'h00000000 | 17 | 5'b10000 | 31'h0000FFFF |
| 2 | 5'b00001 | 31'h00000001 | 18 | 5'b10001 | 31'h0001FFFF |
| 3 | 5'b00010 | 31'h00000003 | 19 | 5'b10010 | 31'h0003FFFF |
| 4 | 5'b00011 | 31'h00000007 | 20 | 5'b10011 | 31'h0007FFFF |
| 5 | 5'b00100 | 31'h0000000F | 21 | 5'b10100 | 31'h000FFFFF |
| 6 | 5'b00101 | 31'h0000001F | 22 | 5'b10101 | 31'h001FFFFF |
| 7 | 5'b00110 | 31'h0000003F | 23 | 5'b10110 | 31'h003FFFFF |
| 8 | 5'b00111 | 31'h0000007F | 24 | 5'b10111 | 31'h007FFFFF |
| 9 | 5'b01000 | 31'h000000FF | 25 | 5'b11000 | 31'h00FFFFFF |
| 10 | 5'b01001 | 31'h000001FF | 26 | 5'b11001 | 31'h01FFFFFF |
| 11 | 5'b01010 | 31'h000003FF | 27 | 5'b11010 | 31'h03FFFFFF |
| 12 | 5'b01011 | 31'h000007FF | 28 | 5'b11011 | 31'h07FFFFFF |
| 13 | 5'b01100 | 31'h00000FFF | 29 | 5'b11100 | 31'h0FFFFFFF |
| 14 | 5'b01101 | 31'h00001FFF | 30 | 5'b11101 | 31'h1FFFFFFF |
| 15 | 5'b01110 | 31'h00003FFF | 31 | 5'b11110 | 31'h3FFFFFFF |
| 16 | 5'b01111 | 31'h00007FFF | 32 | 5'b11111 | 31'h7FFFFFFF |

FIG. 12

| Input | | Output | | | | |
|---|---|---|---|---|---|---|
| oe | pol | ctl t | ctl sp A | ctl sn A | ctl sp B | ctl sn B |
| 0 | 0 | 1 | 0 | 0 | 0 | 0 |
| 0 | 1 | 1 | 0 | 0 | 0 | 0 |
| 1 | 0 | 0 | 1 | 0 | 0 | 1 |
| 1 | 1 | 0 | 0 | 1 | 1 | 0 |

FIG. 13

CIRCUITS FOR INTERMEDIATE-FREQUENCY-FILTERLESS, DOUBLE-CONVERSION RECEIVERS

CROSS-REFERENCE TO RELATED APPLICATIONS

This application claims the benefit of U.S. Provisional Patent Application No. 63/130,070, filed Dec. 23, 2020, and is a continuation-in-part of U.S. patent application Ser. No. 17/176,349, filed Feb. 16, 2021, which claims the benefit of U.S. Provisional Patent Application No. 62/977,007, filed Feb. 14, 2020, and of U.S. Provisional Patent Application No. 63/130,070, filed Dec. 23, 2020, each of which is hereby incorporated by reference herein in its entirety.

STATEMENT REGARDING FEDERALLY SPONSORED RESEARCH OR DEVELOPMENT

This invention was made with government support under grant 1733857 awarded by the National Science Foundation. The government has certain rights in the invention.

BACKGROUND

The ever-increasing demands on wireless throughput require modern handset receivers to aggregate signals from multiple non-contiguously allocated RF carriers. Accordingly, new receivers that can receive signals from multiple non-contiguous RF carriers are desirable.

SUMMARY

In accordance with some embodiments, circuits for intermediate-frequency-filterless, double-conversion receivers are provided.

In some embodiments, circuits for a receiver are provided, the circuits comprising: N first mixers that each receive an input signal, that are each clocked by a different phase of a first common clock frequency, and that each provide an output, wherein N is a count of the first mixers; and for each of the N first mixers: a set of M second mixers, wherein M is a count of the second mixers in the set, wherein each second mixer in the set of M second mixers receives as an input the output of a same one of the N first mixers unique to the set, wherein each of the M second mixers in the set is clocked by a different phase of a second common clock frequency, and wherein each of the second mixers has an output; a set of M resistors having a first side and a second side, wherein the first side of each of the set of M resistors is connected to the output of a corresponding one of the set of M second mixers; and a set of M trans-impedance amplifiers that each having an input connected to the second side of a corresponding one of the set of M resistors and having an output.

BRIEF DESCRIPTION OF THE DRAWINGS

FIG. 10 is an example of a table for sinusoidally modulating a transconductor of an in-phase branch of a receiver in accordance with some embodiments.

FIG. 11 is an example of a table for sinusoidally modulating a transconductor of a quadrature-phase branch of a receiver in accordance with some embodiments.

FIG. 12 is an example of a table for thermometer coding in accordance with some embodiments.

FIG. 13 is an example of a table for controlling transconductance unit cells in accordance with some embodiments.

DETAILED DESCRIPTION

In accordance with some embodiments, circuits for intermediate-frequency-(IF)-filter-less, double-conversion receivers for concurrent dual-carrier reception are provided.

Figure 1:
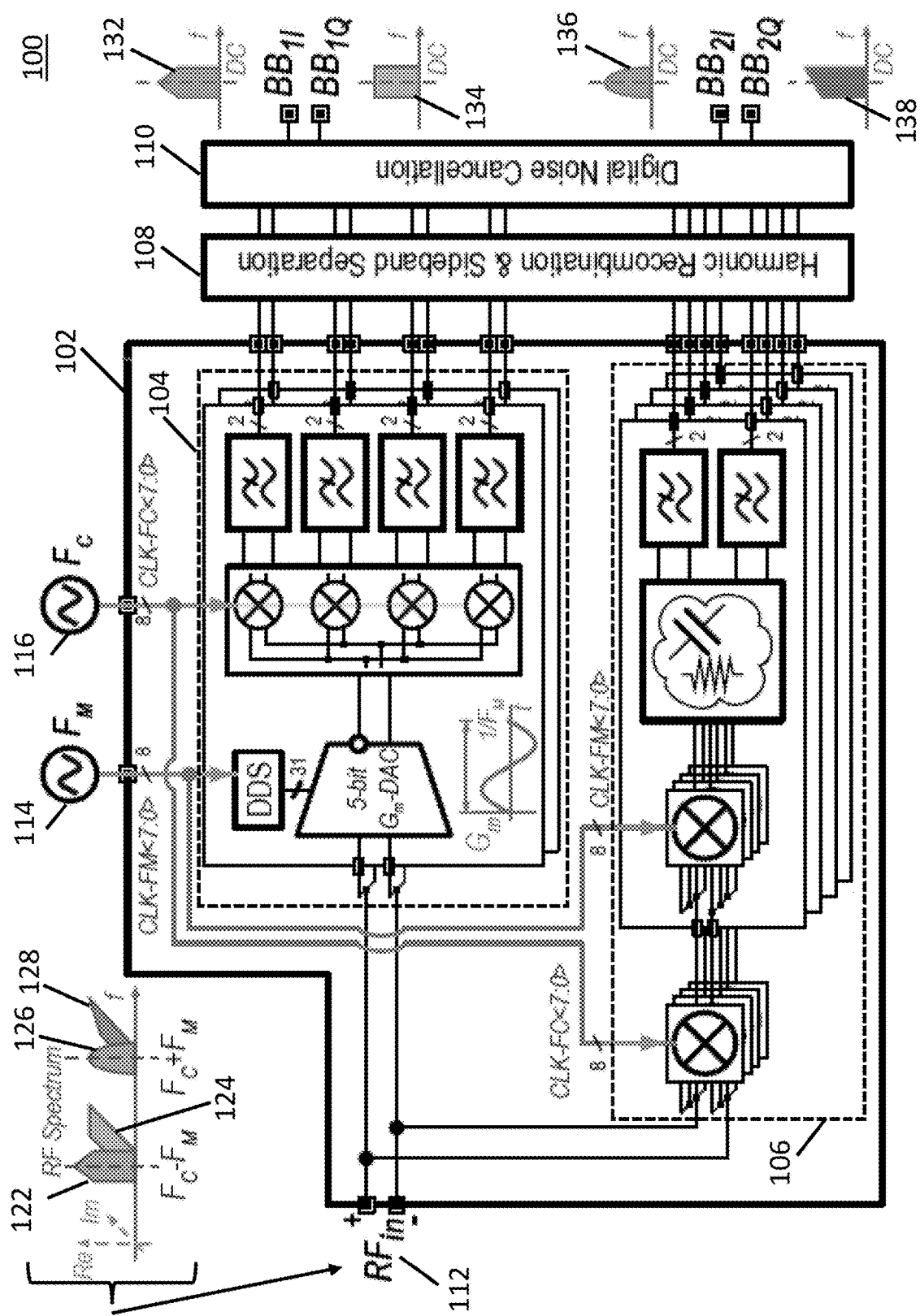
FIG. 1 is an example of a schematic of a receiver in accordance with some embodiments.

Turning to FIG. 1, in accordance with some embodiments, an example 100 of a schematic of a circuit for an intermediate-frequency-(IF)-filter-less, double-conversion receiver for concurrent dual-carrier reception is shown. As illustrated, circuit 100 includes a receiver front end 102 (which comprises two low-noise transconductance amplifier (LNTA) branches 104 and multiple double-conversion mixer-first branches 106), harmonic recombination and sideband separation circuitry 108, digital noise cancellation circuitry 110, a first clock source 114, and a second clock source 116.

In some embodiments, the circuit of FIG. 1 supports concurrent reception from two RF carriers have frequencies in a range from 100 MHz to 1200 MHz and separated apart by 200 MHz to 600 MHz.

In some embodiments, during operation in some modes, double-conversion mixer-first branches 106 translate a low-pass baseband impedance twice: first to a frequency $F_M$; and then to a frequency ($F_C$+/−$F_M$). In some embodiments, doing this provides concurrent narrow-band impedance matching at two distinct frequencies only, while reflecting out-of-band signals for good linearity.

In some embodiments, LNTA branches 104 use direct digital synthesis (DDS)-modulated LNTAs for multi-phase, switched-transconductance mixing at $F_M$, and standard 8-phase mixing at $F_C$ with harmonic rejection (HR) baseband circuits.

In some embodiments, two RF carriers at ($F_C$+/−$F_M$) can be received, while spurious responses at (m·$F_C$+/−n·$F_M$) can be reduced for m<(M−1) (e.g., 7) and n<(N−1) (e.g., 15) with M-phase (e.g., 8-phase) $F_C$ and N-phase (e.g., 16 phase) $F_M$ clocks, where M and N are integers and powers of 2.

If some embodiments, this architecture can be extended to more clock phases to suppress more harmonics, subject to the process technology supporting the necessary clock speeds. For example, compared to 6 nm CMOS, a better process node (i.e., CMOS processes with smaller transistor feature lengths) (e.g., in 28 nm CMOS) usually offers a better logic gate for smaller gate delay and faster edge transition. Thus, in some embodiments, if one were to use 28 nn CMOS process, the DDS circuits can operate at a significantly higher clock speed to support more DDS clock phases.

As shown in FIG. 1, signals received at $RF_{in}$ 112 can include real and imaginary components 122 and 124, respectively, at $F_C$-$F_M$ and real and imaginary components 126 and 128, respectively, at ($F_C$+$F_M$). In response to these signals, circuit 100 can produce components 132, 134, 136, and 138 at the outputs of digital noise cancellation circuitry 110.

Although circuit 100 is shown in FIG. 1 as being implemented in a differential manner, it should be understood that circuit 100 can be implemented in a single-ended manner in some embodiments.

Figure 2:
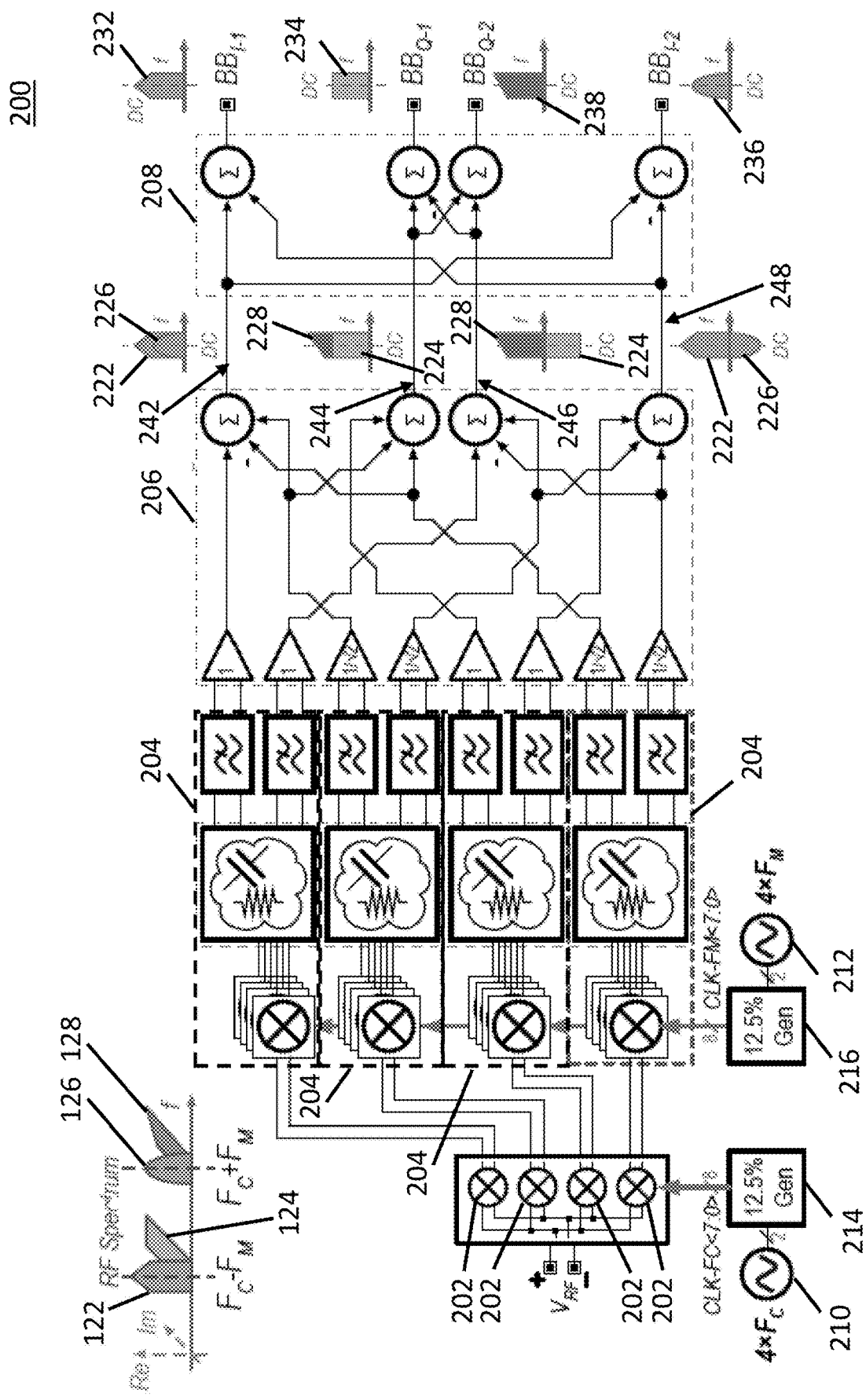
FIG. 2 is an example of a schematic of a mixer-first branch of a receiver in accordance with some embodiments.

Turning to FIG. 2, an example 200 of a schematic of a circuit that can be used to implement four double-conversion mixer-first branches (MFBs) 106 and portions of circuitry 108 in accordance with some embodiments is shown. In some embodiments, circuit 200 creates an RF interface with tuned impedance matching at ($F_C$+/−$F_M$).

As illustrated, circuit 200 includes four first layer mixers 202, four second layer circuits 204, harmonic recombination circuits 206, sideband separation circuits 208, first clock source 210, second clock source 212, first 12.5% duty cycle clock generator 214, and second 12.5% duty cycle clock generator 216.

In some embodiments, RF signals around ($F_C$+/−$F_M$) are received at $V_{RF}$, down-converted to $F_M$, and then further down-converted to baseband without IF filtering. The eight baseband outputs from second layer circuits 204 are harmonically combined into four linearly independent outputs 242, 244, 246, and 248, while rejecting higher-order $F_C$ harmonics. Addition and subtraction circuits then extract the I/Q components from each RF carrier to provide signals $BB_{I-1}$, $BB_{Q-1}$, $BB_{Q-2}$, and $BB_{I-2}$.

As described above in connection with FIG. 1, signals in $V_{RF}$ received at mixers 202 can include real and imaginary components 122 and 124, respectively, at $F_C$-$F_M$ and real and imaginary components 126 and 128, respectively, at $F_C$+$F_M$. In response to these signals, circuitry 206 can produce components 222 and 226 (corresponding to components 122 and 126, respectively) at 242, components 224 and 228 (corresponding to components 124 and 128, respectively) at 244, components 224 and 228 (corresponding to components 124 and 128, respectively) at 246, and components 222 and 226 (corresponding to components 122 and 126, respectively) at 248. Components 232, 234, 238, and 236 can then provided at outputs $BB_{I-1}$, $BB_{Q-1}$, $BB_{Q-2}$, and $BB_{I-2}$, respectively.

In some embodiments, mixers 202 can be implemented in any suitable manner. For example, in some embodiments mixers 202 can be implemented using RF switches. In some embodiments, each RF switch can be realized as a custom-designed LVT RF NMOS transistor, placed in a deep N-well with the body terminal floating to ground.

In some embodiments, a switch width of 100 μm can be used for both the first-layer mixers (mixers 202) and the second-layer mixers (mixers 302 (see below)). In some embodiments, an alternate way to size the switches of mixers 202 and 302 is to use small-size switches for the $F_C$ clock (mixers 202) and large-size switches for the $F_M$ clock (mixers 302), such that the sum of the two switch resistances stays the same.

In some embodiments, each of first layer mixers 202 is clocked by a unique pair of phases (e.g.: phases 0 and 4; phases 1 and 5; phases 2 and 6; or phases 3 and 7) of an eight (0 . . . 7) phase, 12.5% duty cycle, non-overlapping clock at a frequency $F_C$.

Although circuit 200 is shown in FIG. 2 as being implemented in a differential manner, it should be understood that circuit 200 can be implemented in a single-ended manner in some embodiments.

Figure 3:
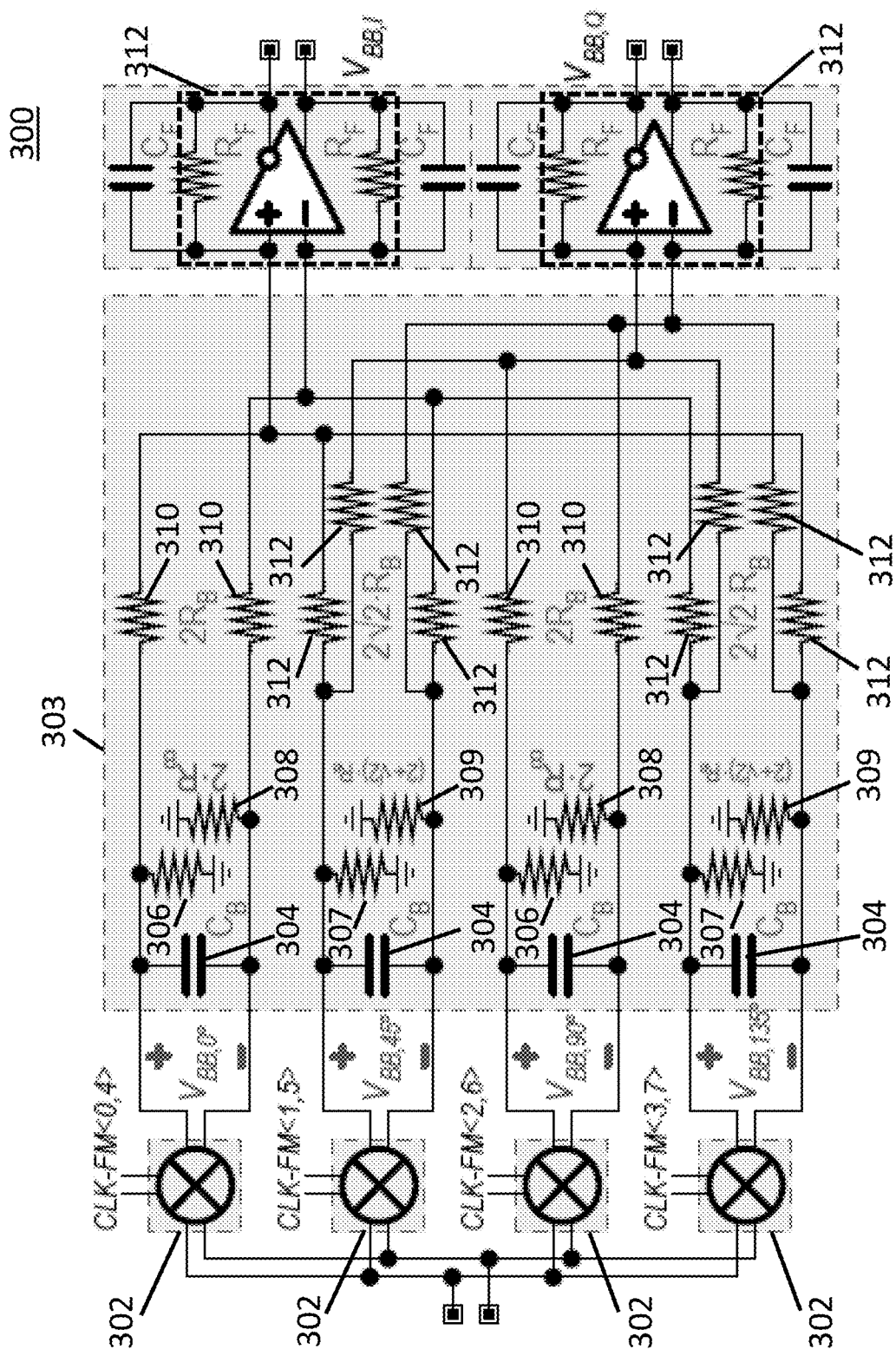
FIG. 3 is an example of a schematic of second layer circuitry of a mixer-first branch of a receiver in accordance with some embodiments.

Turning to FIG. 3, an example 300 of a schematic of a circuit that can be used to implement each second layer circuit 204 of FIG. 2 in accordance with some embodiments is shown. As illustrated, circuit 300 includes four differential passive mixers 302 (each of which is connected to two of eight $F_M$ clock phases as shown in the figure), a passive HR termination network 303, two differential transimpedance amplifiers (TIAs) 312, and four feedback capacitors CF.

Although circuit 300 is shown in FIG. 3 as being implemented in a differential manner, it should be understood that circuit 300 can be implemented in a single-ended manner in some embodiments.

In some embodiments, mixers 302 can be implemented in any suitable manner. For example, in some embodiments mixers 302 can be implemented using switches which can be custom-design LVT RF NMOS transistors, placed in a deep N-well with body terminals floating to ground.

In some embodiments, passive HR termination network 303 includes baseband capacitors $C_B$ 304, and resistors 306, 307, 308, 309, 310, and 312. In some embodiments, resistors 306 and 308 can have values of $2*R_B$, resistors 307 and 309 can have values of $(2+\sqrt{2})*R_B$, resistors 310 can have values of $2*R_B$, and resistors 312 can have values of $2*\sqrt{2}*R_B$, where $R_B$ is any suitable value as described below. In some embodiments, $C_B$ can have a value of 10 pF, CF can have a value of 3.5 pF (for single-carrier reception) or 0.89 pF (for dual-carrier reception), and RF can have a value of 4.5 kΩ (for single-carrier reception) or 18 kΩ (for dual-carrier reception).

In some embodiments, during operation, passive HR termination network 303 combines the down-converted signals with sinusoidal weighting in currents, while maintaining a constant resistance seen by the baseband capacitors $C_B$. It rejects 3rd and 5th $F_M$ harmonics at the input of baseband TIAs 312 and offers a tuned impedance matching at $F_M$. By providing circuit 300 as the termination of each first-layer mixer 202, which uses a pair of an 8-phase differential passive mixers clocked at $F_C$, the tuned RF interface is then translated to $(F_C+/-F_M)$.

The narrow-bandpass tuned impedance matching at $(F_C+/-F_M)$ reflects the out-of-band blocker signals, thus enhancing the out-of-band linearity of LNTA branches 104 significantly.

Figure 4:
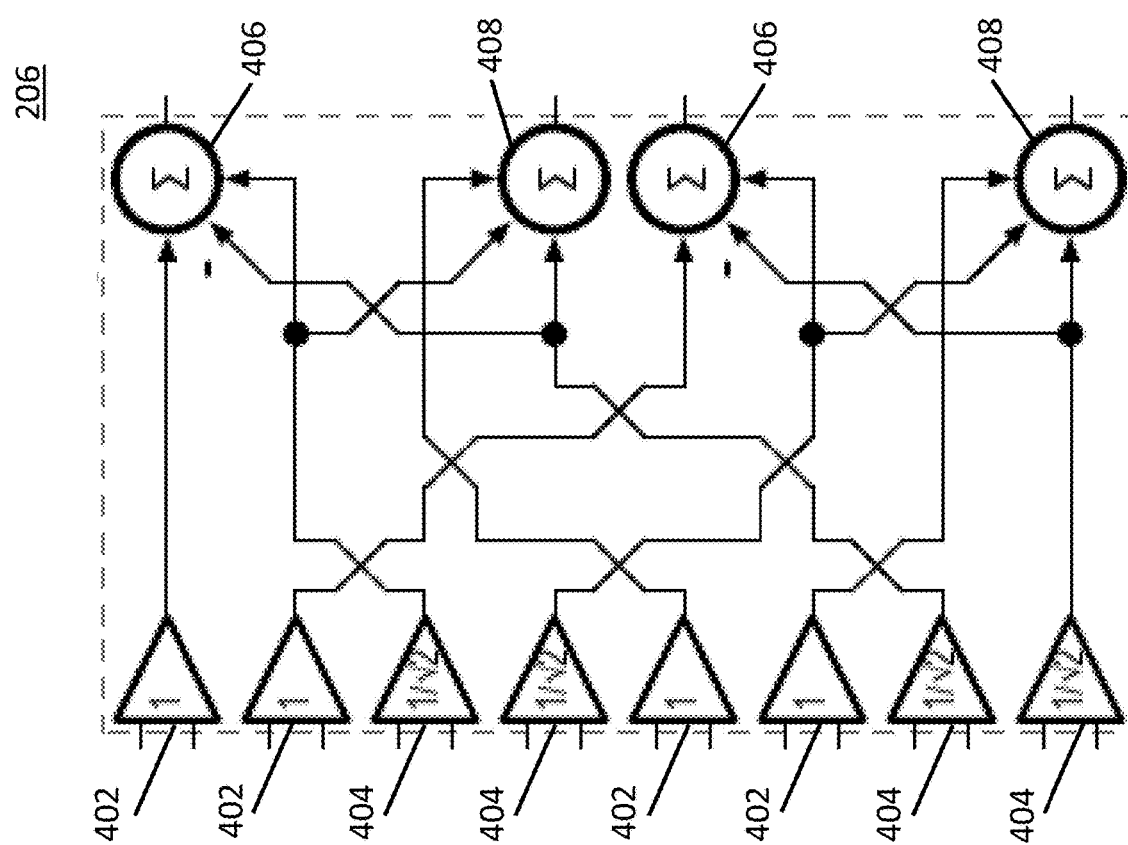
FIG. 4 is an example of a schematic of harmonic recombination circuitry of a receiver in accordance with some embodiments.

Turning to FIG. 4, components of harmonic recombination circuitry 206 are shown in accordance with some embodiments. As illustrated, circuitry 206 includes amplifiers 402 and 404, subtracters 406, and adders 408 in some embodiments. Any suitable amplifiers can be used to implement amplifiers 402 and 404, and amplifiers 402 and 404 can have gains of one and $1/\sqrt{2}$, respectively, in some embodiments. Any suitable subtracters and adders can be used to implement subtracters 406 and adders 408, respectively, in some embodiments.

Figure 5:
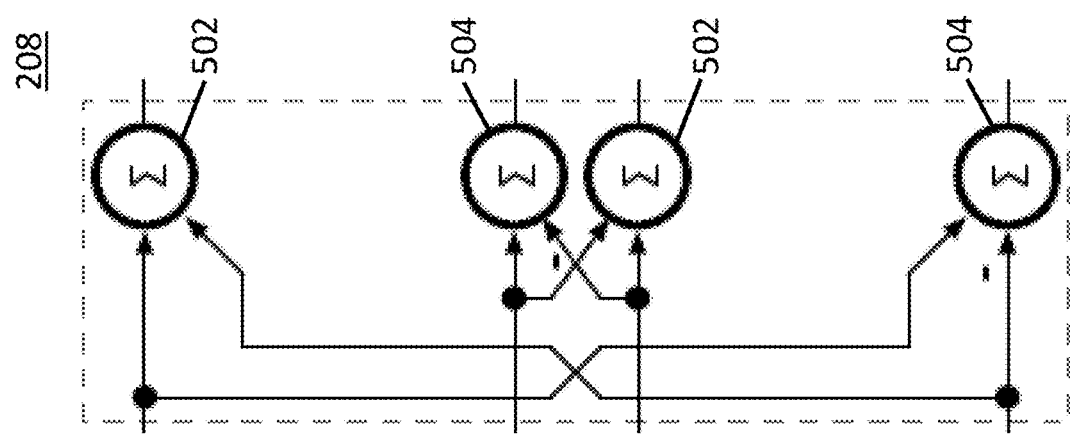
FIG. 5 is an example of a schematic of sideband separation circuitry of a receiver in accordance with some embodiments.

Turning to FIG. 5, components of sideband separation circuitry 208 are shown in accordance with some embodiments. As illustrated, circuitry 208 includes adders 502 and subtracters 504 in some embodiments. Any suitable adders and subtracters can be used to implement adders 502 and subtracters 504, respectively, in some embodiments.

As described further below, in some embodiments, circuit 100 can be configured to operate in a variety of modes. For example, in some embodiments, circuit 100 can be configured for single-carrier reception or for concurrent, double-carrier reception.

In some embodiments, when the circuit of FIG. 1 is performing single-carrier reception, first-layer mixers 202 can be bypassed using any suitable circuitry (e.g., switches (not shown)), and second-layer mixers 302 can be clocked at $F_C$ instead of at $F_M$. In some such embodiments, four sets of second layer circuits 204 can be operated in parallel to help reduce the switch and routing resistance and improve the out-of-band $S_{11}$ reflection for better linearity, but at the cost of a dynamic power penalty. Alternatively, in some such embodiments, all but one second layer circuit can be turned off.

In some embodiments, when the circuit of FIG. 1 is performing concurrent, dual-carrier reception, the double-conversion mixer-first branches can be treated as two 8-path filters connected in series and terminated with low-pass, baseband impedances. These double-conversion mixer-first branches can be implemented in a fully single-ended, a single-ended-differential, or a fully differential realization.

In some embodiments, when the circuit of FIG. 1 is operating for single-carrier reception as described above and in a single-ended realization, its RF input impedance can be represented by:

$$Z_{in}(\omega) = \frac{1}{4} \cdot \left\{ 2R_{SW} + 8 \cdot \sum_{m=-\infty}^{+\infty} |\alpha_m|^2 \cdot Z_{BB}(\omega - m \cdot \omega_C) \right\} \quad (1)$$

$$= \frac{R_{SW}}{2} + 2 \cdot \sum_{m=-\infty}^{+\infty} |\alpha_m|^2 \cdot Z_{BB}(\omega - m \cdot \omega_C)$$

where $Z_{BB}(W)$ is the loading impedance, $R_{SW}$ is the passive mixer switch resistance, m is any integer, $|\alpha_m|=|\text{sinc}(m\pi/8)/8|$, and we is $2\pi F_C$. For a source impedance of 50Ω and ideal mixer switches (i.e., $R_{SW}=0$), $R_B$ needs to be 1.68 kΩ for impedance matching.

Similarly, in some embodiments, when the circuit of FIG. 1 is operating for single-carrier reception as described above and in a differential realization, its RF input impedance can be represented by:

$$Z_{in}(\omega) = \frac{1}{4} \cdot \left\{ 4R_{SW} + 8 \cdot \sum_{m=-\infty}^{+\infty} |2\alpha_m|^2 \cdot Z_{BB}(\omega - m \cdot \omega_C) \right\} \quad (2)$$

$$= R_{SW} + 2 \cdot \sum_{m=-\infty}^{+\infty} |2\alpha_m|^2 \cdot Z_{BB}(\omega - m \cdot \omega_C)$$

where m is an odd integer. For a source impedance of 100Ω and ideal mixer switches, $R_B$ needs to be 0.84 kΩ for impedance matching.

In some embodiments, when the circuit of FIG. 1 is operating for dual-carrier reception and in a fully single-ended double-conversion mixer-first branch, its RF input impedance can be represented as follows:

$$Z_{in}(\omega) = 2R_{SW} + 8^2 \cdot \sum_{m=-\infty}^{+\infty} \sum_{n=-\infty}^{+\infty} |\alpha_m|^2 \cdot |\alpha_n|^2 \cdot \cdot Z_{BB}[\omega - (m \cdot \omega_C + n \cdot \omega_M)] \quad (3)$$

where m, n are any integers, $|\alpha_n|=|\text{sinc}(n\pi/8)/8|$, we is $2\pi F_C$, and $\omega_M$ is $2\pi F_M$. The input impedance is then twice the switch resistance in series with the scaled, frequency-translated baseband impedance at $(m \cdot F_C+n \cdot F_M)$. For ideal mixer switches (i.e., $R_{SW}=0$), $R_B$ needs to be 3.53 kΩ for impedance matching.

In some embodiments, the profiles have spurious matching at $(m \cdot F_C+n \cdot F_M)$ where m and n are any integers. To reduce the spurious matching, the second-layer passive mixers can be realized differentially, given that the first-layer passive mixers produce differential outputs. The RF input impedance can thus be represented by:

$$Z_{in}(\omega) = 2R_{SW} + \quad (4)$$
$$\frac{8^2}{2} \cdot \sum_{m=-\infty}^{+\infty} \sum_{n=-\infty}^{+\infty} |\alpha_m|^2 \cdot |\alpha_n|^2 \cdot \cdot \left[1 + e^{-j \cdot (m+n) \cdot \pi}\right]^2 \cdot Z_{BB}[\omega - (m \cdot \omega_C + n \cdot \omega_M)].$$

where m and n are any integers. Impedance matching now occurs at $(m \cdot F_C + n \cdot F_M)$, where (m+n) is even. For ideal mixer switches, $R_B$ needs to be 1.76 kΩ for impedance matching.

With a differential realization of both the first-layer mixers and the second-layer mixers, the unwanted responses get suppressed for even m and n. The RF input impedance can thus be represented by:

$$Z_{in}(\omega) = 4R_{SW} + \frac{8^2}{2} \cdot \sum_{m=-\infty}^{+\infty} \sum_{n=-\infty}^{+\infty} |2\alpha_m|^2 |2\alpha_n|^2 \cdots Z_{BB}[\omega - (m \cdot \omega_C + n \cdot \omega_M)] \quad (5)$$

where m, n are both odd integers. For ideal mixer switches, $R_B$ needs to be 0.88 kΩ for impedance matching, hence the $R_B$ values for both single-carrier and concurrent dual-carrier reception are the same to the first order.

Figure 6:
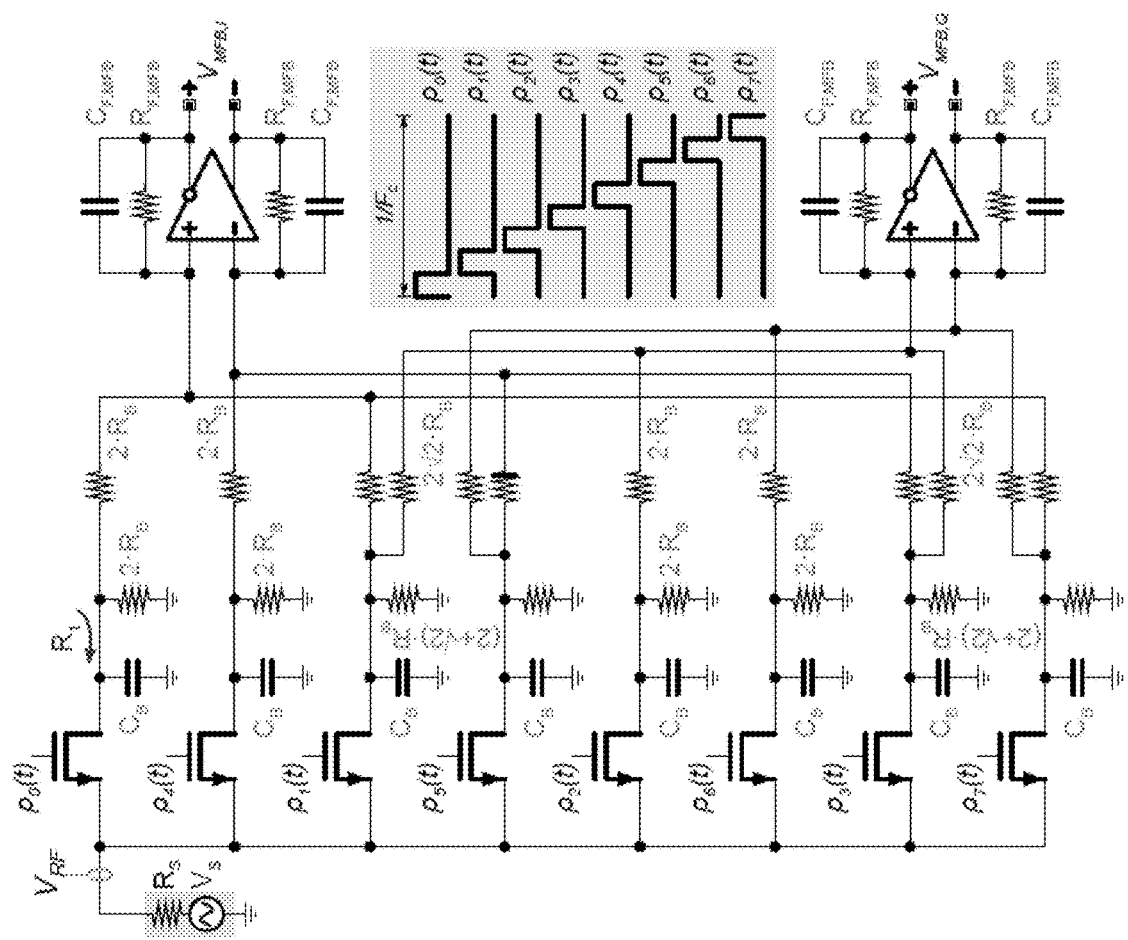
FIG. 6 is an example of a schematic of a single-ended mixer first branch of a receiver in accordance with some embodiments.

In some embodiments in which single-carrier reception is being performed as described above, the first-layer passive mixers are bypassed, and the four sets of second-layer mixers are operated in parallel and clocked at $F_C$. In this case, the total switch resistance will be reduced by a factor of four. In some embodiments, FIG. 6 can be used to study gain and noise performance of this configuration. In some embodiments, the circuit of FIG. 6 performs the harmonic recombination at the baseband TIA inputs. The conversion gain can be derived as:

$$CG_{MFB,SNGL} \equiv \frac{V_{MFB,I}}{V_{RF}} = \frac{G_{MXR} \cdot R_{F,MFB}}{R_{SW} + \eta R_B} \quad (6)$$

$$= \frac{1}{4} \cdot \frac{R_{F,MFB}}{R_{SW} + \eta R_B} \cdot \mathrm{sinc}(\pi/8)$$

where $G_{MXR} = \mathrm{sinc}(\pi/8)/4$ is the passive mixer current conversion gain, $R_{F,MFB}$ is the TIA feedback resistance, and $\eta = 8 \cdot |\alpha_1|^2$ is the impedance translation coefficient.

The noise factor of this configuration can be represented by:

$$F \approx \frac{1}{\mathrm{sinc}^2(\pi/8)} \cdot \left\{ 1 + \frac{R_{SW}}{R_S} + \frac{R_B}{8R_S} \cdot \left[1 + \sqrt{2} \cdot \left(\frac{R_1 + R_B}{R_B}\right)^2\right] + \frac{\gamma}{G_{m,op} R_S} \cdot \left[\frac{1}{4} + \frac{R_1 + R_B}{2} \cdot \left(\frac{\sqrt{2}}{2} \cdot \frac{1}{R_B} + \frac{1}{R_{F,MFB}}\right)\right]^2 \right\} \quad (7)$$

For $R_S = 50\Omega$, $R_{SW} = 2.5\Omega$, $R_B = 399.2\Omega$, $\gamma = 1$ (for 65 nm CMOS process), $G_{m,op} = 3$ mS, $R_1 = (R_S + R_{SW})$, and $R_{F,MFB} = 4.5$ kΩ, the NF is calculated as 12.2 dB, whereas a simulated NF using schematic-level behavioral models can be calculated as 12.4 dB. The 0.2 dB difference probably stems from the power loss.

In some embodiments, a single-ended-differential realization yields the same performance as that of a fully differential realization. Thus, in some embodiments, the conversion gain from the RF input to the sideband-separated output for fully differential realization can be represented by:

$$CG_{MFB,DUAL} = \frac{1}{2R_{SW} + 2\eta^2 \cdot R_B} \cdot G_{MXR}^2 R_{F,MFB} \cdot 2 \cdot 2 \quad (8)$$

$$= \frac{1}{4} \cdot \frac{R_{F,MFB}}{2R_{SW} + 2\eta^2 \cdot R_B} \cdot \mathrm{sinc}^2(\pi/8)$$

where $2\eta^2$ is the impedance translation coefficient of the single-ended-differential configuration in equation (4). The first factor of '2' stems from the harmonically recombining gain for the $F_C$ clocks, and the second factor of '2' is the sideband separation gain. Under the impedance matching condition (i.e., $2R_{SW} + 2\eta^2 \cdot R_B = R_S$), equation (8) reduces to:

$$CG_{MFB,DUAL} = \frac{1}{4} \cdot \frac{R_{F,MFB}}{R_S} \cdot \mathrm{sinc}^2(\pi/8) \quad (9)$$

Following the same logic and procedures, the noise factor can be represented by:

$$F \approx \frac{1}{\mathrm{sinc}^4(\pi/8)} \cdot \left\{ 1 + \frac{2R_{SW}}{R_S} + \frac{R_B}{(8^2/2) \cdot R_S} \cdot \left[1 + \sqrt{2} \cdot \left(\frac{R_1 + R_B}{R_B}\right)^2\right] + \frac{\gamma}{G_{m,op} R_S} \cdot \frac{1}{4} \cdot \left[\frac{1}{4} + \frac{R_1 + R_B}{2} \cdot \left(\frac{\sqrt{2}}{2} \cdot \frac{1}{R_B} + \frac{1}{R_{F,MFB}}\right)\right]^2 \right\} \quad (10)$$

where $R_1$ now is $(8^2/2) \cdot (R_S + 2R_{SW})$. For $R_S = 50\Omega$, $2R_{SW} = 10\Omega$, $R_B = 1412\Omega$, $\gamma = 1$, $G_{m,op} = 750$ uS, and $R_{F,MFB} = 18$ kΩ, the NF is calculated as 13.1 dB, whereas the simulated NF is 13.6 dB. The 0.5 dB difference probably stems from the power loss.

In some embodiments, due to the time-varying nature and the transparency of the passive mixers in the first and second layers, the mixer-first branches may exhibit harmonic folding and down-conversion. While undesired signals at clock harmonics are down-converted, a differential N-path realization as described herein in accordance with some embodiments can help to suppress the responses at the even clock harmonics. In some embodiments, the HR termination networks described herein combine the down-converted signals in current with sinusoidal weights to reject the responses at the odd clock harmonics, up to the 5th harmonic. Undesired signals at clock harmonics can fold to the desired signal band. The harmonic folding rejection ratio (HFRR), which is the ratio of the gain of the wanted RF signals to the gain of the unwanted RF signals that fold back to the desired signal band, can be represented by:

$$HFRR_{(m,n)} = \left| \frac{\mathrm{sinc}^2(\pi/8)}{\mathrm{sinc}(m\pi/8)\mathrm{sinc}(n\pi/8)} \right| \quad (11)$$

where $m = 8k_1 \pm 1$, $n = 8k_2 \pm 1$, and $k_1, k_2 \in \mathbb{Z}$. In some embodiments, increasing the number of clock phases, especially for the $F_M$ clocks, can be used to mitigate the harmonic folding, however, at the cost of reducing the maximum RF operating frequency and increasing the dynamic switch power. In some embodiments, 8 phases can be used for both $F_C$ and $F_M$ clocks for the double-conversion mixer-first branches.

Double-conversion LNTA branches are incorporated into the circuit of FIG. 1 to perform noise cancellation with the mixer-first branches for better receiver sensitivity.

Figure 7:
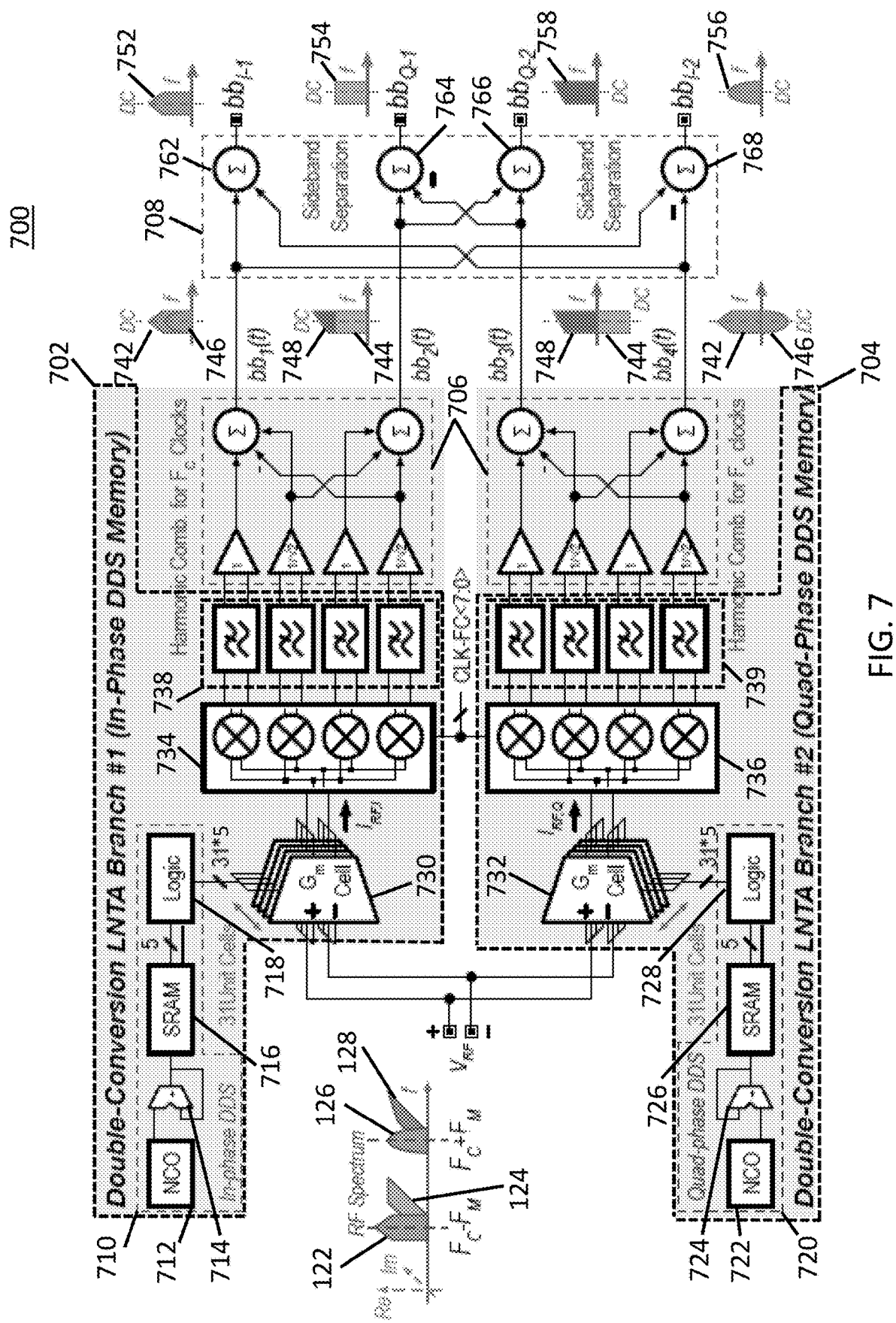
FIG. 7 is an example of a schematic of a two dual-conversion low noise transconductance amplifier branches of a receiver in accordance with some embodiments.

Turning to FIG. 7, an example 700 of a schematic of circuitry that can be used to implement LNTA branches 104 and part of circuitry 108 of FIG. 1 in accordance with some embodiments is illustrated.

As shown, circuitry 700 includes LNTA branches 702 and 704, harmonic combination circuits 706 and sideband separation circuits 708.

As described above in connection with FIG. 1, signals in $V_{RF}$ can include real and imaginary components 122 and 124, respectively, at $F_C-F_M$ and real and imaginary components 126 and 128, respectively, at $F_C+F_M$. In response to these signals, circuits 706 can produce components 742 and 746 (corresponding to components 122 and 126, respectively) at $bb_{1(t)}$, components 744 and 748 (corresponding to components 124 and 128, respectively) at $bb_{2(t)}$, components 744 and 748 (corresponding to components 124 and 128, respectively) at $bb_{3(t)}$, and components 742 and 746 (corresponding to components 122 and 126, respectively) at $bb_{4(t)}$. Components 752, 754, 758, and 756 can then be provided at outputs $bb_{I-1}$, $bb_{Q-1}$, $bb_{Q-2}$, and $bb_{I-2}$, respectively.

In some embodiments, to support concurrent signal reception, the LNTA branches combine conventional low-noise receiver design with direct digital synthesis (DDS) modulation.

In some embodiments, each LNTA can be include DDS circuits 710/720, 31 (or any other suitable number) transconductor unit slices 730/732, mixers 734/736, and filters 738/739. Any suitable transconductor unit slices can be used to implement slices 730/732 in some embodiments. In some embodiments, mixers 734/736 can be implemented similarly to mixers 202 of FIG. 2, as described above. Filters 738/739 can be implemented in any suitable manner, such as using TIAs with feedback capacitors similarly to what is illustrated in FIG. 3, in some embodiments.

Each DDS circuit 710/720 comprises a numerically controlled oscillator (NCO) 712/722, a phase accumulator 714/724, a 32-depth (or any other suitable size) memory 716/726, and a logic decoder 718/728.

Each NCO 712/722 can provide a clock output at a frequency (e.g., for 8-phase DDS modulation, the NCO can provide a clock frequency of $8*F_M$, and for 16-phase DDS modulation, the NCO can provide a clock frequency of $16*F_M$) set by a hardware processor or any other suitable control mechanism (not shown).

Each phase accumulator 714/724 can accumulate a count based on the output of the corresponding NCO and a control input (not shown) that controls the rate (e.g., 1×, 2×, 4×, 8×, etc.) at which the accumulator increments its count (e.g., for 8-phase DDS modulation, the accumulator can have an increment of 4, and for 16-phase DDS modulation, the accumulator can have an increment of 2).

Each memory 716/726 can include a look-up table that contains data for sinusoidally modulating the transconductor unit slices. In some embodiments, this table can be created as shown in FIG. 10 (for in-phase) or FIG. 11 (for quadrature-phase). As shown, the tables can receive a 5-bit (or any other suitable size) input and provide a 5-bit (or any other suitable size) magnitude ("MAG") output and a polarity ("POL") bit.

Each logic decoder 718/728 can include a thermometer encoding table (e.g., such as the table of FIG. 12) for converting the 5-bit magnitude output by the corresponding memory 716/726 into a 31-bit (or any other suitable size) thermometer encoded output. Each logic decoder 718/728 can also include 31 (or any other suitable number) transconductor unit cell control tables (an example of which is shown in FIG. 13). Each bit of the thermometer encoded output can the drive its own transconductor unit cell control table. The bit of the thermometer encoded output can be used as an output enable ("oe") input along with the corresponding polarity bit ("pol") to drive the transconductor unit cell control table. As illustrated, in response to the input signals "oe" (output enable) and "pol" (polarity), each transconductor unit cell control table can provide five output signals ctl_t, ctl_sp_A, ctl_sn_A, ctl_sp_B, and ctl_sn_B, which can be used to control transmission gates 812 in FIG. 8 as shown of a corresponding transconductor unit cell.

In this way, during operation, transconductance unit cells 730/732 can be sinusoidally modulated at $F_M$ by DDS circuits 710 and 720, in some embodiments.

Each LNTA branch operates as a multi-phase, switched-transconductance mixer to translate signals from ($F_C \pm F_M$) to $F_C$ in some embodiments. In some embodiments, to reject 3rd and 5th $F_M$ harmonics, the DDS phase accumulator increment can be set to 4 and the DDS circuits can be clocked at $8 \cdot F_M$. In some embodiments, to additionally reject 7th and 9th $F_M$ harmonics, the DDS phase accumulator increment can be set to 2 and the DDS circuits can be clocked at $16 \cdot F_M$.

In some embodiments, the RF currents at the outputs of the transconductor unit cells ($I_{RF,I}$ and $I_{RF,Q}$ in FIG. 7) are translated from $F_C$ to baseband using passive mixers driven by 8-phase 12.5%-duty-cycle, non-overlapping clocks at $F_C$. The outputs of the four baseband TIAs are harmonically combined by circuits 706 to reject 3rd and 5th $F_C$ harmonics.

The two LNTA branches, when modulated with in-phase and quadrature-phase sinusoidal DDSs 710 and 720, respectively, generate four outputs, $bb_1(t)$, $bb_2(t)$, $bb_3(t)$, $bb_4(t)$, at the output of harmonic recombination circuits 706 that contain overlapping but linearly independent I/Q components from the two RF carriers at ($F_C \pm F_M$). The I/Q components of each RF carrier are extracted using baseband addition and subtraction circuits 762, 764, 766, and 768 in sideband separation circuits 708. For example, by summing the outputs $bb_1(t)$ and $bb_4(t)$ with addition circuit 762, the in-phase component $bb_{I-1}$ from the lower RF carrier is obtained.

The components of circuits 706 and 708 can be implemented in the same manner as corresponding components in FIGS. 4 and 5 as described above.

In some embodiments, for single-carrier reception, one LNTA branch can be disabled, and the DDS controls in the other LNTA branch can be fixed, so that the receiver operates as an 8-phase harmonic rejection (HR) receiver.

The conversion gain of each LNTA branch from RF input to baseband output when operating in a dual-carrier reception mode can be represented by:

$$CG_{LB,DUAL} = \frac{1}{2} \cdot G_{m,pk} R_{F,LB} \cdot \mathrm{sinc}\left(\frac{\pi}{N}\right) \cdot \mathrm{sinc}\left(\frac{\pi}{8}\right) \quad (12)$$

where N is the number of DDS modulation phases, $G_{m,pk}$ is the peak LNTA transconductance, and $R_{F,LB}$ is the TIA feedback resistance.

For single-carrier operation, the branch operates as an 8-phase HR receiver with a conversion gain given by:

$$CG_{LB,SNGL} = \frac{1}{2} \cdot G_{m,pk} R_{F,LB} \cdot \mathrm{sinc}\left(\frac{\pi}{8}\right) \quad (13)$$

which is very close to equation (12) except for the sinc($\pi$/N) multiplication factor. In some embodiments, the conversion gains for both modes are very close; for 8-phase modulation, the conversion gain in the dual-carrier reception mode is only 0.2 dB lower than the gain for single-carrier reception, while for 16-phase modulation, the conversion gain is only 0.1 dB lower.

The noise factor of the DDS-modulated LNTA branch with 8-phase modulation at $F_M$ and 8-phase HR mixing at $F_C$ can be represented by:

$$F_{LB} = \frac{1}{\text{sinc}^4(\pi/8)} \cdot \left\{ 2 + \frac{2\gamma}{G_{m,pk}R_S} \cdot \left[1 + 2\cos\left(\frac{\pi}{4}\right)\right]\right\} \quad (14)$$

where the first term of '2' is due to the noise of $R_S$ (the source resistance) and $R_T$ (the termination resistance).

The noise factor with 16-phase DDS modulation at $F_M$ and 8-phase HR mixing at $F_C$ can be represented by:

$$F_{LB} = \frac{1}{\text{sinc}^2(\pi/8) \cdot \text{sinc}^2(\pi/16)} \cdot \\ \left\{ 2 + \frac{2\gamma}{G_{m,pk}R_S} \cdot \left[\frac{1}{2} + \cos\left(\frac{\pi}{8}\right) + \cos\left(\frac{\pi}{4}\right) + \cos\left(\frac{3\pi}{8}\right)\right]\right\}. \quad (15)$$

For the double-conversion LNTA branches, the harmonic rejection happens in both the $F_C$ and $F_M$ clock domains. To the first order, the harmonic rejection ratio (HRR) is obtained by multiplying two HRR expressions; e.g., when using 8-phase DDS modulation and 8-phase $F_C$ clocks, the HRR at the sideband-separated outputs of the double-conversion LNTA branches at $(m \cdot F_C + n \cdot F_M)$ is:

$$HRR_{(m,n)} = \\ \frac{\text{sinc}(\pi/8)}{\text{sinc}(m\pi/8)} \cdot \frac{\text{sinc}(\pi/8)}{\text{sinc}(n\pi/8)} \cdot \frac{1 + \rho_c \cdot 2\cos(\pi/4)}{1 + \rho_c \cdot 2\cos(m\pi/4)} \cdot \frac{1 + \rho_m \cdot 2\cos(\pi/4)}{1 + \rho_m \cdot 2\cos(n\pi/4)} \quad (16)$$

where m, n are both odd integers, $\rho_m$ is the ratio of the quantized, mid-level transconductance and the peak transconductance, and $\rho_c$ is the ratio of the baseband voltage gains used in the harmonic recombining network for the $F_C$ clock.

In some embodiments, the mixer-first architecture with the incorporated, double-conversion LNTA branches as described herein can only cancel part of the noise of the baseband termination resistors shown in FIG. 3. Because of the configuration of the HR termination network, some of the noise appears with the same conversion polarity at the outputs of the two signal branches, and some appear in with an opposite conversion polarity. For example, the noise due to the shunt $2R_B$ and $(2+\sqrt{2})R_B$ resistors in the mixer-first branches will produce outputs with an opposite polarity, whereas the noise due to the series $2R_B$ and $(2\sqrt{2})R_B$ resistors produces outputs with the same polarity.

As described above, in some embodiments, the circuit of FIG. 1 can operate in a single-carrier reception mode. In this mode, the passive mixers of the LNTA branches are driven by the same 8-phase 12.5%-duty cycle, non-overlapping clocks at $F_C$ as those for the mixer-first branches. The noise factor after cancellation when in this mode, $F_{NC,SNGL}$, can be represented by:

$$F_{NC,SNGL} = \frac{\overline{v_{no,SNGL}^2}/\Delta f}{2 \cdot 4kTR_S \cdot \left[\frac{R_{SW} + \eta R_B}{R_S + R_{SW} + \eta R_B} \cdot (CG_{LB,SNGL} - K \cdot CG_{MFB,SNGL})\right]^2} \quad (17)$$

where $\overline{v_{no,SNGL}^2}/\Delta f$ is the total noise at the combined output, k is the Boltzmann constant, and T is temperature.

By properly selecting the value of K (the coefficient to adjust the relative gain of the two LNTA branches, which can be found by simulation), the noise due to any of the resistors is 303 of FIG. 3 and the baseband op-amps can be partially cancelled.

In some embodiments, when the circuit of FIG. 1 is operating in dual-carrier reception mode and is being modulated by 8-phase in-phase and quadrature-phase DDSs, the noise factor after sideband separation with noise cancellation, $F_{NC,DUAL}$, can be represented by:

$$F_{NC,DUAL} = \frac{\overline{v_{no,DUAL}^2}/\Delta f}{2 \cdot 4kTR_S \cdot \left[\frac{2R_{SW} + 2\eta^2 \cdot R_B}{R_S + 2R_{SW} + 2\eta^2 \cdot R_B} \cdot (CG_{LB,SNGL} - K \cdot CG_{MFB,SNGL})\right]^2} \quad (18)$$

where $\overline{v_{no,DUAL}^2}/\Delta f$ is the total noise at the combined output.

In some embodiments, the bandwidth at the RF input node should cover all significant higher-order harmonics (e.g, the 3rd, 5th, 7th, and 9th clock harmonics for 8-phase receivers) to avoid a large NF degradation. E.g., the bandwidth at the RF input node should be greater than 4900 MHz for $F_C$=700 MHz.

Figure 8:
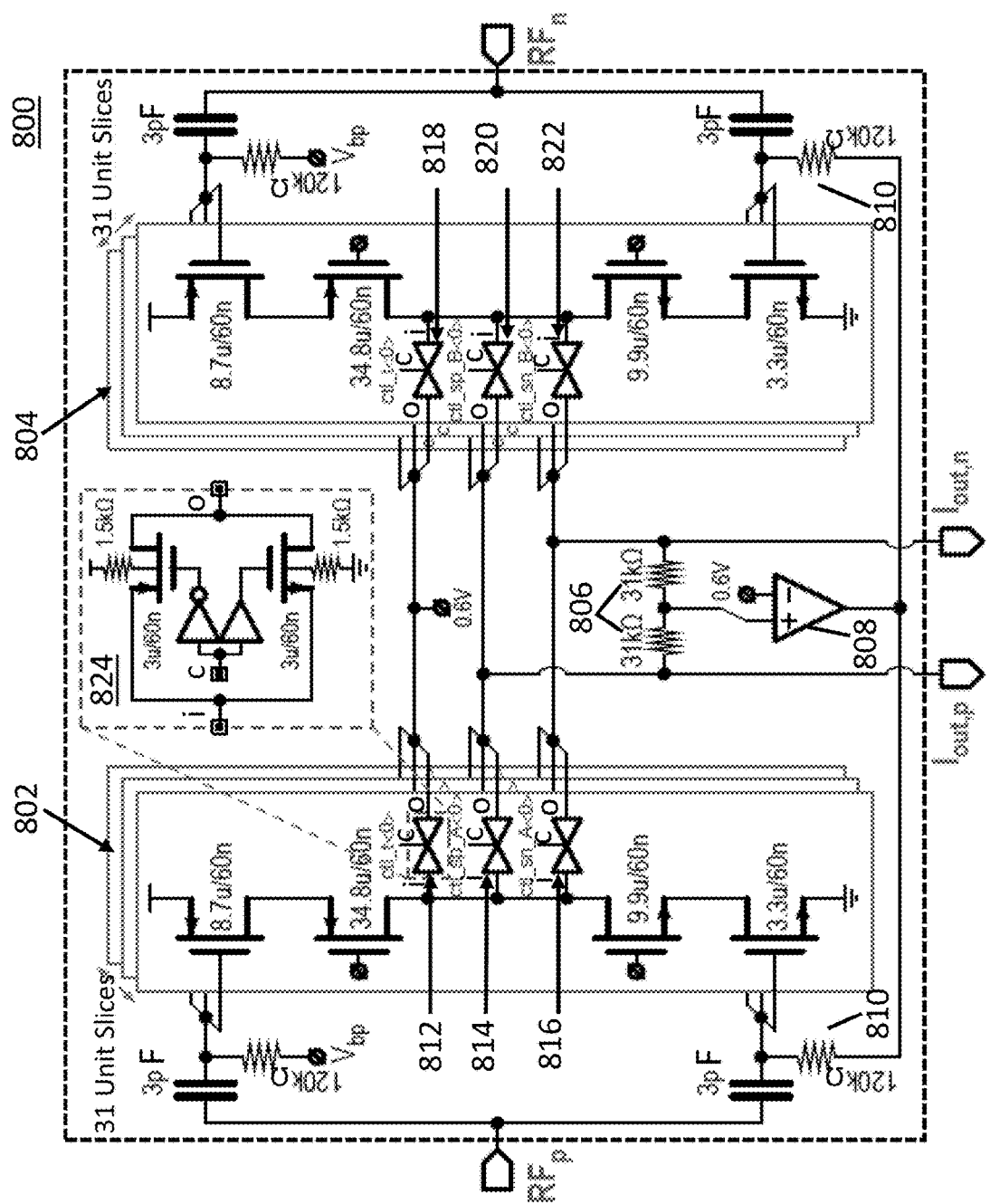
FIG. 8 is an example of a schematic of a low noise transconductance amplifier of a receiver in accordance with some embodiments.

Turning to FIG. 8, an example 800 of a schematic of a differential modulated low noise transconductance amplifier (LNTA) that can be used to implement LNTAs 730 and 732 of FIG. 7 in accordance with some embodiments is shown.

As illustrated in FIG. 8, the differential modulated LNTA uses two cascoded common-source amplifiers 802 and 804. In some embodiments, there can be 31 (or any other suitable number) identical unit slices in each of the cascoded common-source amplifiers. As also shown, all 31 (or any other suitable number) of the unit slices share a central common-mode feedback circuit (comprising resistors 806, operational amplifier 808, and resistors 810) for stabilized DC operating points.

In some embodiments, the common-source devices can be sized for a (gm/ID) of 10 (or any other suitable number) for good linearity, and the cascoded devices can be sized for a (gm/ID) of 16 (or any other suitable number) for good noise performance.

In some embodiments, to enable or disable a slice rapidly during modulation, the output of each unit slice can be connected to a switch matrix (e.g., formed by transmission gates 812-822 in FIG. 8) that conducts the RF current to either the subsequent mixing stage (via transmission gates 814, 816, 820, and 822 controlled by ctl_sp_A<0:30>, ctl_sn_A<0:30>, ctl_sp_B<0:30>, ctl_sn_B<0:30>), respectively, or a dummy low-impedance termination (e.g., 0.6V at the output (o) of transmission gates 812 and 818 controlled by ctl_t<0:30>).

As shown in FIG. 8, each of transmission gates 812-822 can be formed as shown in 824.

In some embodiments, the operating frequency of each LNTAs is limited by the junction capacitances from drain and source terminals of the LNTA to the substrate. These capacitances stem from the cascoded devices and the switch matrices. In some embodiments, to mitigate these capacitances, the switches in all of the switch matrices after each unit slice can be designed with transmission gates using low-voltage CMOS technology (LVT) devices with floating bodies to rails. In some embodiments, for the same purpose, the 8-phase mixers can use transmission gates that are also floating their bodies to rails. In some embodiments, this approach can result in each mixer cell having a 20% reduction in parasitic capacitance with 8Ω switch resistance.

Figure 9:
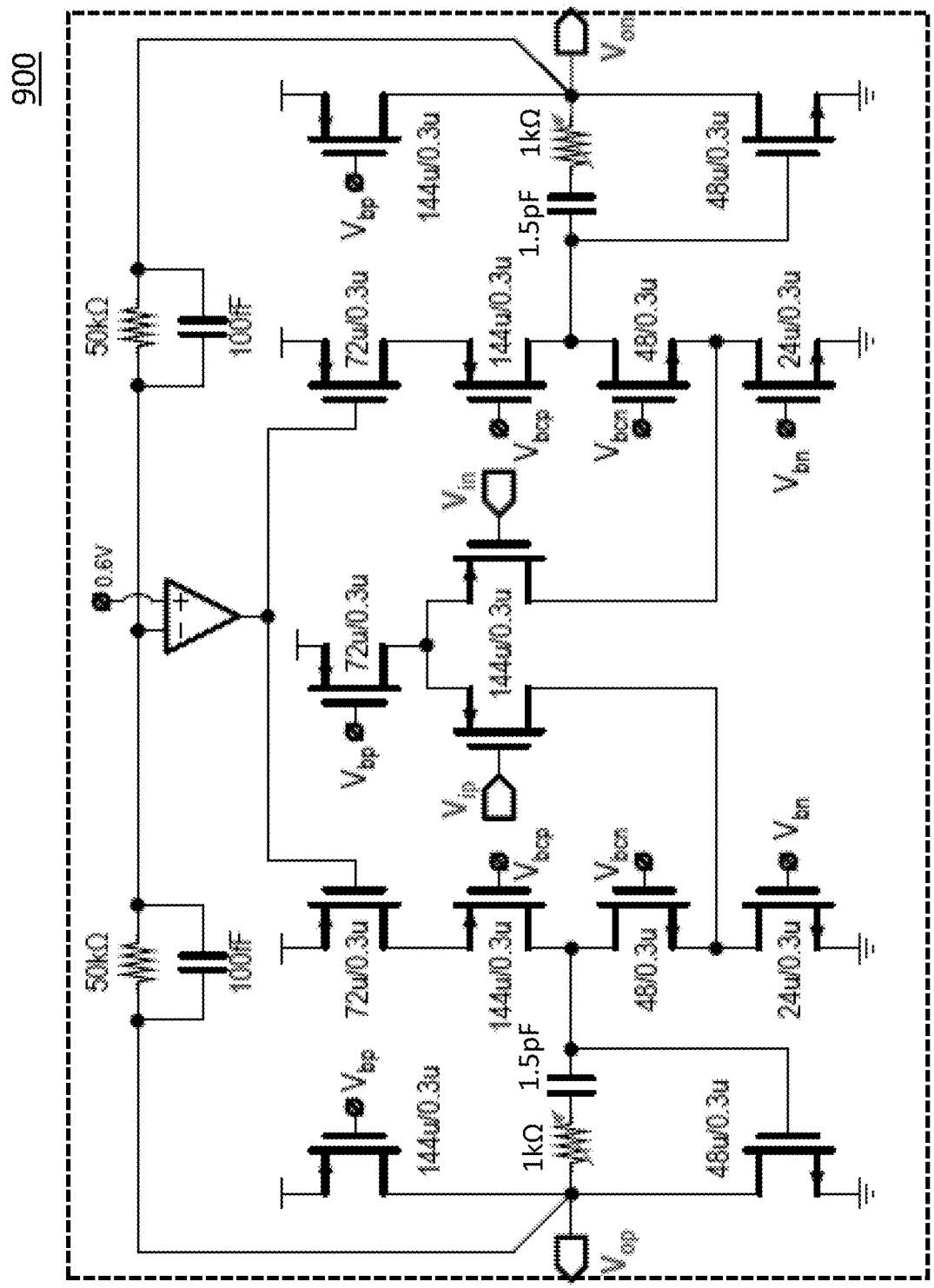
FIG. 9 is an example of Miller compensated trans-impedance amplifiers of a receiver in accordance with some embodiments.

Turning to FIG. 9, an example 900 of a schematic of a Miller-compensated operational amplifier that can be used to implement baseband transimpedance amplifiers of low-noise transconductance amplifier (LNTA)branches 104 and multiple double-conversion mixer-first branches 106 of FIG. 1 in some embodiments is shown.

In some embodiments, the TIAs can use programmable feedback resistors and programmable feedback capacitors for gain control and bandwidth control, respectively.

In some embodiments, each TIA has an equivalent, differential 15 pF capacitor at its inputs to attenuate the down-converted, out-of-band blocking signals.

It is noted that in FIGS. 8 and 9, certain component sizes and voltages are shown. It should be understood that these sizes and voltages are merely for purposes of illustration and that any suitable component sizes and voltages can be used in some embodiments.

The trace routing resistance from the mixer outputs to the baseband TIA inputs limits the linearity of the signal branch. In some embodiments, multiple thin metal layers can be stacked to bring the routing resistance below 3Ω. This resistance can be further reduced with CMOS processes that offer more ultra-thick metal (UTM) layers in some embodiments.

In some embodiments, for the non-overlapping mixer clocks at $F_C$, differential input clocks running at $4 \cdot F_C$ can be first divided by four using standard, 4-stage CMOS latches, producing 8-phase 50%-duty-cycle clocks, and then NOR logic gates can be used to generate the 8-phase 12.5%-duty-cycle, non-overlapping clocks. In some embodiments, the nonoverlapping mixer-clocks at $F_M$ can be generated in the same way.

In some embodiments, to accommodate the need for different DDS clock rates, extra reconfigurable clock dividers can be used to support 8-phase and 16-phase DDS modulation with higher input clock rates.

In some embodiments, direct digital synthesizer circuits 710 and 720 in LNTA branches 702 and 704, respectively, are designed to vary the LNTA transconductances sinusoidally with a period of $1/F_M$. In some embodiments, direct digital synthesizer circuits 710 and 720 each contains a phase accumulator with programmable accumulating increments, a 7-bit-wide, 32-depth flip-flop-based SRAM as its look-up table, a thermometer-like logic decoder, and 31 drivers for each LNTA unit slice switch matrix.

In some embodiments, in the digital domain, gain and I/Q phase imbalances can be compensated and the signals then harmonically combined to reject 3rd and 5th $F_C$ harmonics. Sideband separation can also be performed to extract I/Q information from each RF carrier in some embodiments.

In some embodiments, for concurrent dual-carrier reception, if, for example, the lower RF carrier is targeted, a single-point calibration can be performed by first injecting a continuous wave tone near the higher RF carrier with a 2 MHz intermediate frequency and acquiring the coefficients for gain and phase mismatches to cancel this tone at the low-band baseband output.

In some embodiments, more sophisticated compensation techniques, like multi-tap adaptive filtering, can be used for further improvement in harmonic rejection and sideband separation.

The resulting calibration coefficients can be used for measurements in some embodiments.

In some embodiments, noise cancellation can be realized by first performing complex baseband shifting and weighting to the mixer-first branch I/Q outputs and then summing these outputs with the LNTA branch outputs.

To cancel the termination noise from the mixer-first branches, standard mixer-first branches arranged in a double-conversion fashion can be used in some embodiments. More particularly, in some embodiments, the outputs of the second-layer, 8-phase mixer switches can be connected to corresponding input of a TIA (one for each mixer) each by a resistor $R_B$, and harmonic recombination can be realized afterward. The noise due to these termination resistors at the outputs of the two signal branches may appear as common mode, whereas the desired signals may appear differential. Then, the termination noise can be fully cancelled, and the system's noise factor becomes:

$$F_{NC} \approx \frac{1}{\mathrm{sinc}^4(\pi/8)} \cdot \left\{1 + \frac{\gamma}{G_{m,pk} R_S} \cdot \left[\frac{1}{2} + \cos\left(\frac{\pi}{4}\right)\right]\right\} \quad (19)$$

In some embodiments, as the number of clock phases increases, the number of TIAs can also be increased. However, to maintain the same noise performance, the TIA operational amplifiers can be sized down, and the TIA feedback resistance can be sized up the same amount in some embodiments.

In some embodiments, more conversion stages can be used to receive more signals by putting one or more extra set of mixers before the first layer mixers. For example, to concurrently receive four carriers at $(F_C \pm F_M \pm FN)$, three layers of passive mixing can be used in the mixer-first branch clocked at $F_C$, $F_M$, and FN with $F_C > F_M > F_N$.

The low-pass, baseband impedance is then first converted to FN, then to $(F_M \pm FN)$, and next to $(F_C \pm F_M \pm FN)$, thus offering narrow-band tuned impedance matching at four distinct frequencies. Signals at those frequencies are down-converted to baseband and can be separated using addition and subtraction circuits. Similarly, more conversion stages can be included after the modulated LNTAs. In this case, the LNTAs are modulated at FN and are followed by two passive-mixing layers clocked at $F_M$ and $F_C$, respectively. However, more passive mixing layers require more series RF switches, resulting in a larger equivalent switch resistance and more complicated signal routing.

Figure 14:
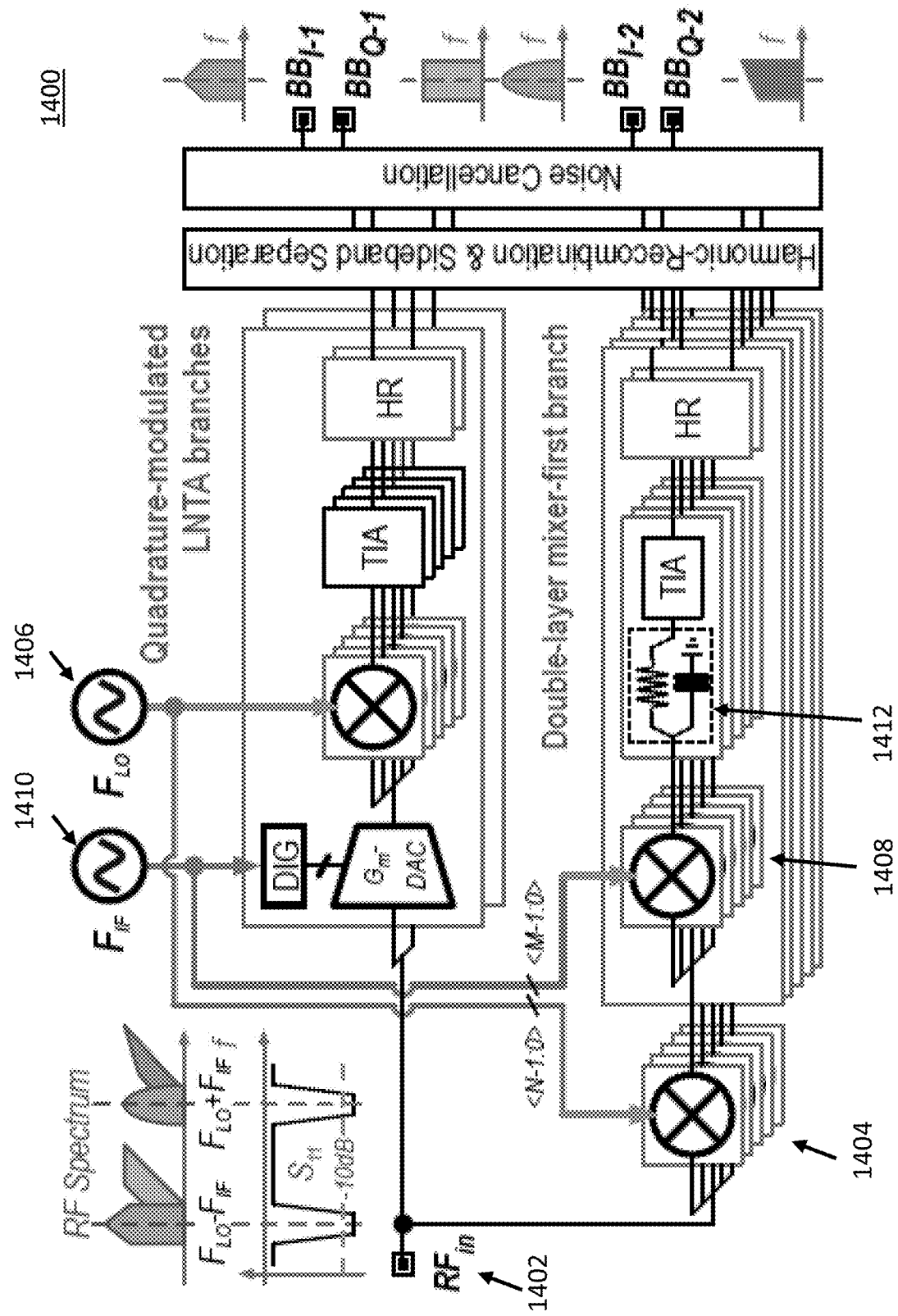
FIG. 14 is an example of a block diagram of double-conversion, noise-cancelling receiver in accordance with some embodiments.

Turning to FIG. 14, an example simplified diagram of a double-conversion, noise-cancelling receiver 1400, featuring concurrent tuned matching, concurrent reception, noise cancellation, and rejection of spurious responses, in accordance with some embodiments is shown. As illustrated in FIG. 14, in some embodiments, first-layer passive mixers 1404 are connected to an RF input 1402 and clocked at $F_{IF}$ by a clock 1406. In some embodiments, second-layer mixers 1408 are clocked at $F_{IF}$ by a clock 1410 and loaded with low-pass, baseband impedances 1412. In some embodiments, this structure up-converts the baseband impedance first to $F_{IF}$ and then to $(F_{LO} \pm F_{IF})$, resulting in tuned, high-Q bandpass RF impedance matching in two frequency bands and low input impedance elsewhere. Meanwhile, in some embodiments, the structure down-converts the RF carriers at these two frequencies and serves as a mixer-first receiver for concurrent signal reception, while rejecting harmonic responses without needing IF filters.

Figure 15:
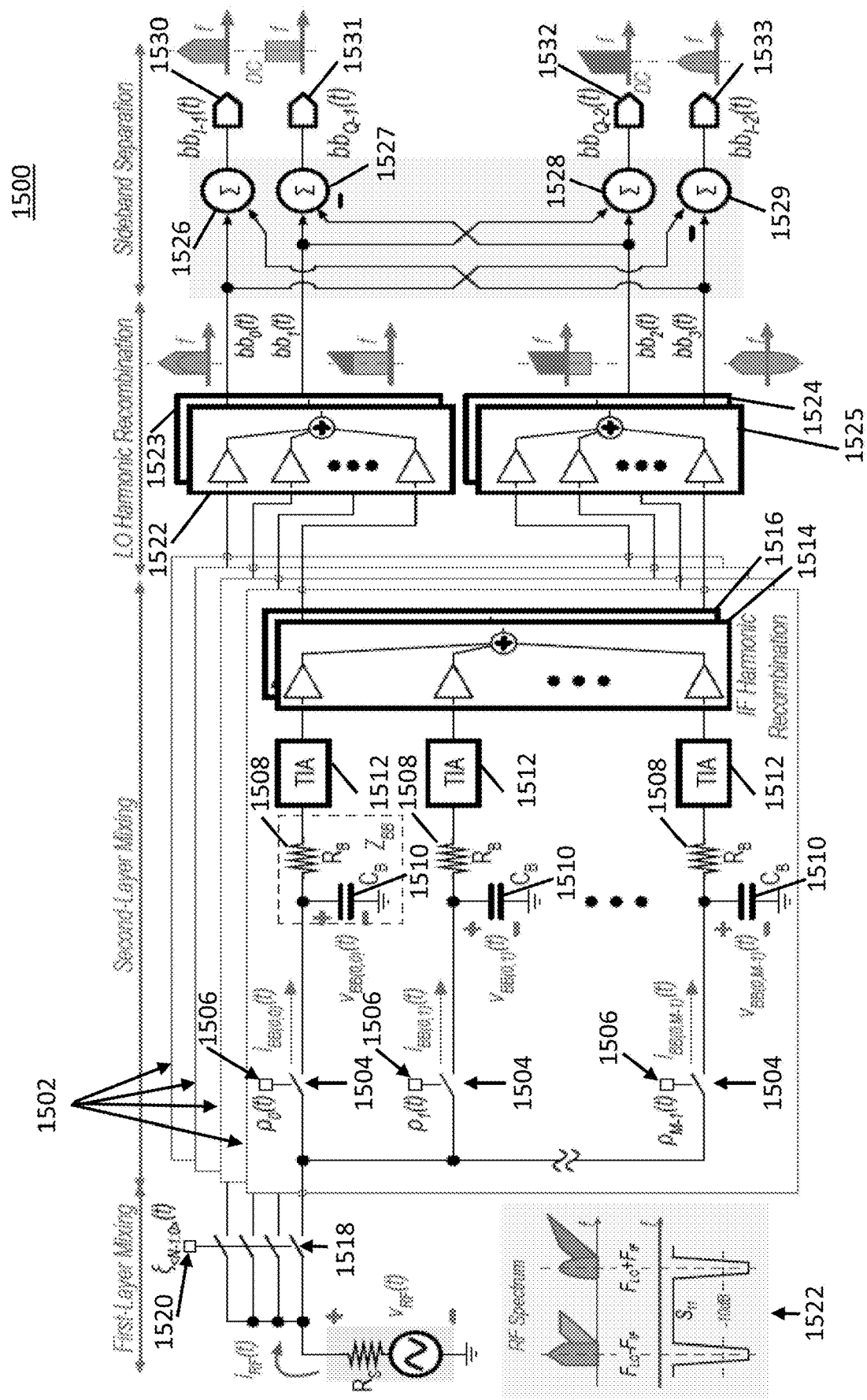
FIG. 15 is an example of a block diagram of a double-layer mixer-first branch in accordance with some embodiments.

Turning to FIG. 15, a block diagram of a double-layer mixer-first branch 1500 that can be used in receiver 1400 and that uses two layers of passive mixing at $F_{LO}$ and $F_{IF}$ and provides narrow-band impedance matching at $(F_{LO} \pm F_{IF})$ while concurrently receiving I/Q information from these two RF carriers in accordance with some embodiments is shown.

Figure 16B:
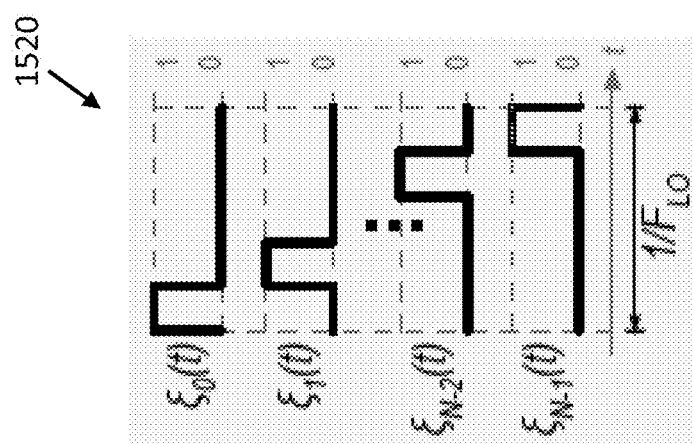
FIG. 16B is an example of a timing diagram showing N non-overlapping clocks at a frequency $F_{LO}$ in accordance with some embodiments.
Figure 16A:
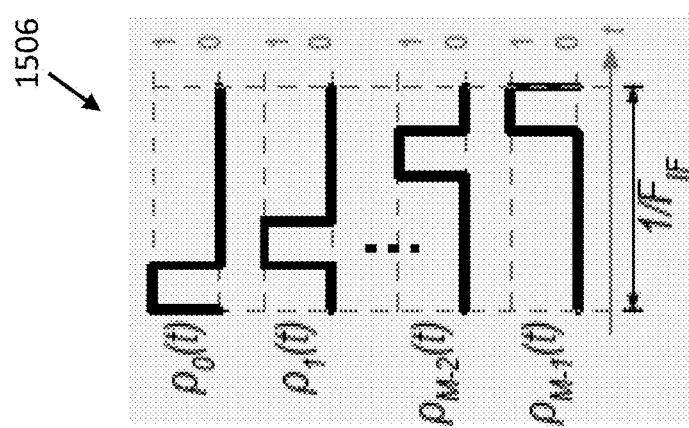
FIG. 16A is an example of a timing diagram showing M non-overlapping clocks at a frequency $F_{IF}$ in accordance with some embodiments.

The operation of double-layer mixer-first branch 1500 that creates an RF interface with tuned impedance matching at $(F_{LO} \pm FT)$ simultaneously in accordance with some embodiments is now described. As shown in FIG. 15, double-layer mixer-first branch 1500 includes N second-layer mixing circuits 1502 in some embodiments. Each of N second-layer mixing circuits 1502 includes M-phase passive mixers 1504 clocked with non-overlapping, M-phase clocks $\rho_i(t)$ 1506 (an example of which is illustrated in FIG. 16A) with frequency $F_{IF}$, termination resistors $R_B$ 1508, capacitors $C_B$ 1510, M baseband TIAs 1512, followed by two $F_{IF}$ harmonic recombining circuits 1514 and 1516, in some embodiments. IF harmonic recombining circuits 1514 and 1516 sum the weighted TIA output voltages to reject responses at higher-order $F_{IF}$ harmonics, in some embodiments. Each set of second-layer mixers 1504 has a tuned input impedance centered at $F_{IF}$, in some embodiments. In some embodiments, by using N sets of second-layer mixers (each set is in a circuit 1502) as the termination for the first-layer, N-phase passive mixers 1518 clocked with non-overlapping, N-phase clocks $\xi_j(t)$ 1520 (an example of which is illustrated in FIG. 16B) with frequency $F_{LO}$, the tuned RF interface is translated to $(F_{LO} \pm F_{IF})$ simultaneously as shown by graphs 1522. In some embodiments, N and M can be any suitable integer values. However, to simplify clock generation, in some embodiments, N and M can be integers that are powers of two (e.g., 4, 8, 16, 32, 64, etc.).

As described above in connection with FIG. 14, in some embodiments, the signal carriers around $(F_{LO} \pm F_{IF})$ in the RF input signal, $V_{RF}(t)$, are first down-converted to $F_{IF}$ at the output of mixers 1518 and then to baseband at the output of mixers 1504.

In some embodiments, the 2N baseband outputs the two IF harmonic recombination circuits 1514 and 1516 across each of the N circuits 1502 are then harmonically combined by LO harmonic recombination circuits 1522, 1523, 1524, and 1525 respectively into four baseband outputs, $bb_0(t)$, $bb_1(t)$, $bb_2(t)$, and $bb_3(t)$, while rejecting input signals around higher-order $F_{LO}$ harmonics, in some embodiments. The I/Q components from each signal carrier, $bb_{I/Q-1}(t)$ and $bb_{I/Q-2}(t)$, at outputs 1530, 1531, 1532, and 1533 can be separated using addition and subtraction circuits 1526, 1527, 1528, and 1529 as shown in FIG. 15, in some embodiments.

In some embodiments, the double-layer mixer branch uses multi-phase $F_{LO}$ clocks, such that the I/Q components of two RF carriers can be obtained from the linearly independent baseband outputs, $bb_0(t)$, $bb_1(t)$, $bb_2(t)$, and $bb_3(t)$, without any IF filtering, in some embodiments.

In some embodiments, double-layer mixer-first branch 1500 can be treated as an N-path filter, terminated with M-path filters that are loaded with low-pass, baseband impedances. In some embodiments, the first layer mixers 1518 and the second layer mixers 1504 can be implemented as both single-ended, as a single-ended-differential combination (i.e., mixers 1518 are single-ended and mixers 1504 are differential), or as both differential.

$Z_{BB}(W)$ (FIG. 14) is the low-pass, baseband impedance, and $z_{BB}(t)$ is its corresponding impulse response in some embodiments. It is assumed that TIAs 1512 provide a good virtual ground within the desired frequency band, such that $Z_{BB}(W)$ is determined by $R_B$ 1508 and $C_B$ 1510, in some embodiments. Given the use of non-overlapping clocks, at any given moment, the RF current $i_{RF}(t)$ flows into only one baseband path, in some embodiments. In some embodiments, the current for the $(x, y)^{th}$ baseband path (where x is a value from 0 to N−1 and y is a value from 0 to M−1) is:

$$i_{BB(x,y)}(t) = [\xi_x(t)\rho_y(t)] \cdot i_{RF}(t). \quad (20)$$

This current then flows into $z_{BB}(t)$ and produces the voltage:

$$v_{BB(x,y)}(t) = \{[\xi_x(t)\rho_y(t)] \cdot i_{RF}(t)\} * z_{BB}(t) \quad (21)$$

where * denotes convolution in some embodiments. In some embodiments, the voltage at the RF side of mixers 1518, $V_{RF}(t)$, at any given moment, is equal to the voltage across the appropriate $(x, y)^{th}$ baseband impedance plus the ohmic drop across two mixer switches in series:

$$v_{RF}(t) = \quad (22)$$
$$2R_{SW} \cdot i_{RF}(t) + \sum_{x=0}^{N-1}\sum_{y=0}^{M-1} [\xi_x(t)\rho_y(t)] \cdot \langle\{[\xi_x(t)\rho_y(t)] \cdot i_{RF}(t)\} * z_{BB}(t)\rangle$$

where $R_{SW}$ is the switch resistance, which is assumed to be equal for both layers of mixers 1518 and 1504. In some embodiments, the Fourier series of $\xi_x(t)$ is:

$$\xi_x(t) = \sum_{k=-\infty}^{+\infty} \alpha_k \exp\left(-jxk\frac{2\pi}{N}\right)\exp(jk\omega_{LO}t) \quad (23)$$

where $\alpha_k=(1/N)\text{sinc}(k\pi/N) \exp(-jk\pi/N)$, k is any integer, and the Fourier series of $\rho_y(t)$ is:

$$\rho_y(t) = \sum_{l=-\infty}^{+\infty} \beta_l \exp\left(-jyl\frac{2\pi}{N}\right)\exp(jl\omega_{IF}t) \quad (24)$$

where $\beta_l=(1/M)\text{sinc}(l\pi/M) \exp(-jl\pi/M)$. In some embodiments, using properties of the Fourier series, the summation term in (22) is:

$$\mathcal{F}\langle[\xi_x(t)\rho_y(t)] \cdot \{[\xi_x(t)\rho_y(t)] \cdot i_{RF}(t) * z_{BB}(t)\}\rangle = \quad (25)$$
$$\sum_{k=-\infty}^{+\infty}\sum_{l=-\infty}^{+\infty}\sum_{p=-\infty}^{+\infty}\sum_{q=-\infty}^{+\infty} \alpha_k \beta_l \alpha_p \beta_q \cdot \exp\left[-jx(k+p)\frac{2\pi}{N}\right]\exp\left[-jy(l+q)\frac{2\pi}{M}\right] \cdot$$
$$I_{RF}[\omega - (k+p)\omega_{LO} - (l+q)\omega_{IF}] \cdot Z_{BB}[\omega - (p\omega_{LO} + q\omega_{IF})]$$

Now, in some embodiments, the Fourier transform of $V_{RF}(t)$ is obtained as:

$$V_{RF}(\omega) = 2R_{SW} \cdot I_{RF}(\omega) + NM \cdot \sum_{k=-\infty}^{+\infty} \sum_{l=-\infty}^{+\infty} \sum_{p=-\infty}^{+\infty} \sum_{q=-\infty}^{+\infty} \alpha_k \beta_l \alpha_p \qquad (26)$$

$$\beta_q \cdot I_{RF}[\omega - (k+p)\omega_{LO} - (l+q)\omega_{IF}] \cdot Z_{BB}[\omega - (p\omega_{LO} + q\omega_{IF})]$$

where $(k+p)=k_1 N$, $(1+q)=k_2 M$, and $k_1, k_2 \in \mathbb{Z}$. In some embodiments, the input impedance $Z_{in}(\omega)$ can be found by ignoring other frequency components except for $(k+p)=0$ and $(l+q)=0$. $V_{RF}(\omega)$ becomes a function of only $I_{RF}(\omega)$ and:

$$Z_{in}(\omega) \equiv \frac{V_{RF}(\omega)}{I_{RF}(\omega)} = \qquad (27)$$

$$2R_{SW} + NM \cdot \sum_{p=-\infty}^{+\infty} \sum_{q=-\infty}^{+\infty} |\alpha_p|^2 |\beta_q|^2 \cdot Z_{BB}[\omega - (p\omega_{LO} + q\omega_{IF})]$$

Figure 17:
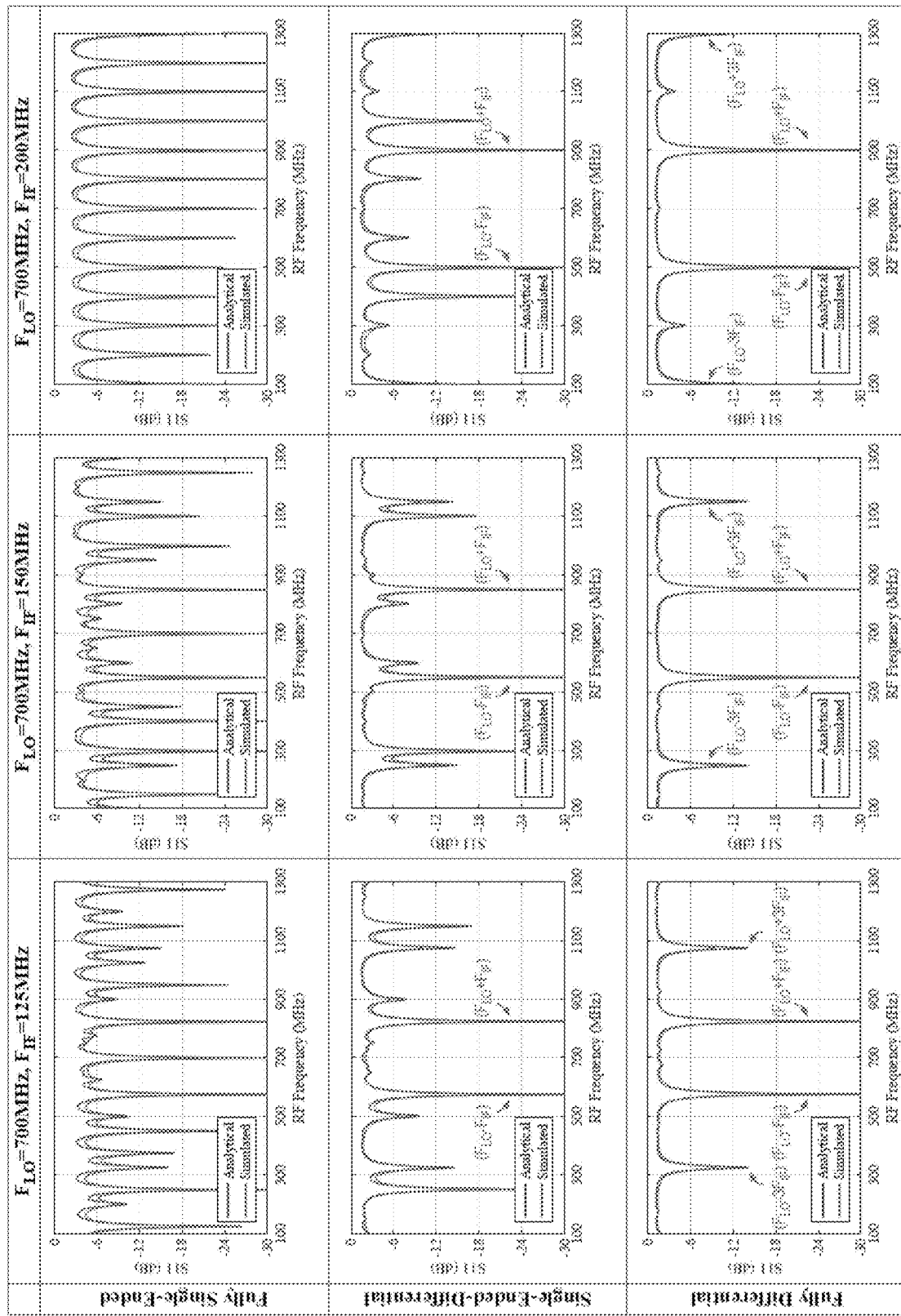
FIG. 17 is an example of S11 graphs for fully singled-ended, single-ended-differential combination, and fully differential implementations of a double-layer mixer-first branch over different pairs of clock frequencies in accordance with some embodiments.

FIG. 17 shows a comparison of analytical and simulated $S_{11}$ profiles for different mixer-first branch implementations for $F_{LO}=700$ MHz and $R_{SW}=1.5\Omega$ but different $F_{IF}$ clock rates when N=M=8, in some embodiments. In some embodiments, for a fully single-ended implementation, $R_S=50\Omega$, $R_B=3.34$ k$\Omega$, and $C_B=5$ pF; for the single-ended-differential implementation, $R_S=50\Omega$, $R_B=1.67$ k$\Omega$, and $C_B=10$ pF; and for the fully differential implementation, $R_S=100\Omega$, $R_B=0.83$ k$\Omega$ and $C_B=20$ pF.

As can be seen in the top row of FIG. 17, in some embodiments, the $S_{11}$ profile for the fully single-ended implementation has the desired impedance matching at $(F_{LO} \pm F_{IF})$ but also has spurious matching at $(pF_{LO}+qF_{IF})$ where $p, q \in \mathbb{Z}$.

In some embodiments, to achieve better $S_{11}$ profiles with less spurious matching, the first-layer passive mixers while single-ended can be configured to produce differential outputs and the second-layer passive mixers can be realized in a differential manner. This results in a single-ended-differential combination implementation. In such an implementation, in some embodiments, the RF input impedance would be:

$$Z'_{in}(\omega) = 2R_{SW} + \frac{NM}{2} \cdot \qquad (28)$$

$$\sum_{p=-\infty}^{+\infty} \sum_{q=-\infty}^{+\infty} |\alpha_p|^2 |\beta_q|^2 \cdot \{1 + \exp[-j(p+q)\pi]\}^2 \cdot Z_{BB}[\omega - (p\omega_{LO} + q\omega_{IF})]$$

To distinguish different expressions for different implementations (e.g., for input impedance, gain, and noise), $(\cdot)'$ is used for single-ended-differential implementations and $(\cdot)''$ is used for fully differential implementations, whereas the expressions without these symbols are for the fully single-ended implementations.

As can be seen in the middle row of FIG. 17, in some embodiments, the number of frequencies where spurious matching occurs reduces significantly for a single-ended-differential combination implementation. However, undesired impedance matching still happens at $(pF_{LO}+qF_{IF})$ where $(p+q)$ is even, in some embodiments.

In some embodiments, a differential implementation for both the first- and the second-layer mixers further improves the $S_{11}$ profiles; the unwanted matching gets suppressed for even p and q. In some embodiments, the differential RF input impedance is:

$$Z''_{in}(\omega) = 4R_{SW} + \frac{NM}{2} \cdot \sum_{p=-\infty}^{+\infty} \sum_{q=-\infty}^{+\infty} |2\alpha_p|^2 |2\beta_q|^2 \cdot Z_{BB}[\omega - (p\omega_{LO} + q\omega_{IF})] \qquad (29)$$

where p, q are both odd integers. As shown in the bottom row of FIG. 17, in some embodiments, impedance matching now occurs for $(F_{LO} \pm FT)$ as desired with a few sets of undesired responses (e.g., $(F_{LO} \pm 3F_{IF})$) creating significant matching within the practical bandwidth, whereas a low input impedance exists for all other frequencies.

Therefore, in some embodiments, for receiver systems allowing the use of RF input baluns, which therefore can provide a differential signal to the first layer mixers, it may be desirable to use a fully-differential implementation for its good matching profiles. For example, in some embodiments, handset receivers using Global System for Mobiles (GSM) and Code Division Multiple Access (CDMA) technologies can use differential RF inputs to make use of common-mode rejection and to leverage the shrinking voltage headroom, and therefore can be implemented using a fully-differential implementation as described herein.

In some embodiments, for receiver systems that do not allow the use of baluns (e.g., due to the limited form factor or system complexity), and which therefore may not provide a differential signal to the first layer mixers, it may be desirable to use a single-ended-differential implementation. For example, in some embodiments, handset receivers using Long-Term Evolution (LTE) and New Radio (NR) technologies can use single-ended RF inputs due to a higher number of supported bands (especially for Carrier Aggregation (CA)), a limited number of package pins, and the cost for differential matching networks, and therefore can be implemented using a single-ended-differential combination implementation as described herein.

In some embodiments, there is a trade-off between "large" and "small" mixer-switch sizing. In a "large"-switch design, the mixers may have a smaller $R_{SW}$ and a larger parasitic switch capacitance than in a "small" switch design. Accordingly, for a given bandwidth, the resistors $R_B$ can be sized larger, and the capacitors $C_B$ can be smaller, in some embodiments. Smaller $R_{SW}$ results in a lower out-of-band impedance and thus better out-of-band signal reflection, and such up-front filtering profile protects the LNTA branches from strong out-of-band blocking signals, in some embodiments. However, this choice faces design challenges, such as larger parasitic switch capacitance and higher switch-clock dynamic power that may be present in some embodiments. Using chip manufacturing processes with reduced parasitics (e.g., silicon on insulator (SOI)) can significantly mitigate those challenges in some embodiments. In a "small"-switch mixer design (i.e., with larger $R_{SW}$), these challenges are mitigated to some extent, in some embodiments. However, in some embodiments, to maintain the impedance matching with the same bandwidth, $R_B$ needs to be smaller (due to the larger $R_{SW}$), which requires larger $C_B$.

As discussed previously, for a single-ended RF input, the single-ended-differential combination implementation has a better matching profile compared to its fully single-ended counterpart. Therefore, below, details of the single-ended-differential combination implementation is discussed in conjunction with FIG. 18, in some embodiments. In some embodiments, the conversion gain of the single-ended-differential combination implementation is:

$$CG'_{MFB} \equiv \frac{V_{BB,1-1}}{V_{RF}} = \frac{R_{F,MFB}}{2R_{SW} + 2\eta R_B} \cdot G_{MX,LO} G_{MX,IF} \cdot \frac{NM}{2} \quad (30)$$

$$= \frac{1}{2} \cdot \frac{R_{F,MFB}}{2R_{SW} + 2\eta R_B} \cdot \mathrm{sinc}(\pi/N) \cdot \mathrm{sinc}(\pi/M)$$

where $R_{F,MFB}$ is the TIA feedback resistance; $G_{MX,LO}=(1/N)\mathrm{sinc}(\pi/N)$ and $G_{MX,IF}=(1/M)\mathrm{sinc}(\pi/M)$ are the current conversion gains of the passive mixers driven by $F_{LO}$ and $F_{IF}$ clocks, respectively; $\eta$ is the impedance translation coefficient and can be derived from (27) as:

$$\eta = \frac{\mathrm{sinc}^2(\pi/N)}{N} \cdot \frac{\mathrm{sinc}^2(\pi/M)}{M} \quad (31)$$

$R_B$ can be left as a design parameter, such that (30) is a generalized gain expression, in some embodiments. In some embodiments, if impedance matching to the antenna source resistance, $R_S$, is desired, $R_B'$ can be selected using the following equation in some embodiments:

$$R_B' = \frac{R_S - 2R_{SW}}{2\eta} \quad (32)$$

For example, in some embodiments, for N=M=8, $R_S$=50Ω, and $R_{SW}$=10Ω, $R_B'$ can be selected as 1.06 kΩ for input matching.

Similarly, in some embodiments, the conversion gain of a differential implementation can be expressed as:

$$CG''_{MFB} = \frac{R_{F,MFB}}{4R_{SW} + 8\eta R_B} \cdot \mathrm{sinc}(\pi/N) \cdot \mathrm{sinc}(\pi/M) \quad (33)$$

where the impedance translation coefficient is $8\eta$.

For matching to $R_S$, $R_B''$ can be found using that following equation, in some embodiments:

$$R_B'' = \frac{R_S - 2R_{SW}}{8\eta} \quad (34)$$

For example, in some embodiments, when N=M=8, $R_{SW}$=10Ω, and $R_S$=100Ω, $R_B''$ can be selected as 0.53 kΩ for input matching.

From (30) and (33), as N, M increases, both sinc factors approach to unity, leading to better noise and harmonic performance, in some embodiments.

For well-designed receivers, in some embodiments, $R_S$, $R_{SW}$, $R_B$, and the base-band op-amps in the TIAs may be the dominant sources of noise, while $R_{F,MFB}$ should not contribute significant noise. In some embodiments, the baseband TIA typically offers a good virtual ground at the baseband frequencies of interest, which simplifies the analysis (since the TIA's input impedance can be ignored).

Regarding the noise from $R_S$ and $R_{SW}$: In some embodiments, these noise sources have a transfer function to the branch output similar to that of the desired signals, except that noise folding needs to be accounted for. In some embodiments, the output noise contribution due to $R_S$ is:

$$\frac{\overline{v_{no,R_S}^2}}{\Delta f} = \quad (35)$$

$$\frac{\overline{v_{n,R_S}^2}}{\Delta f} \cdot \left(\frac{2R_{SW} + 2\eta R_B}{R_S + 2R_{SW} + 2\eta R_B} \cdot CG'_{MFB,N-M}\right)^2 \cdot \frac{2}{\mathrm{sinc}^2(\pi/M) \cdot \mathrm{sinc}^2(\pi/N)}$$

where $\overline{v_{n,R_S}^2} R_S/\Delta f = 4\,kT\,R_S$, k is the Boltzmann constant, and the following factor:

$$\left(\frac{2R_{SW} + 2\eta R_B}{R_S + 2R_{SW} + 2\eta R_B} \cdot CG'_{MFB,N-M}\right)^2$$

accounts for the voltage division between $R_S$ and the in-band input resistance $R_{in}=2R_{SW}+2\eta R_B$; in the following factor:

$$\frac{2}{\mathrm{sinc}^2(\pi/M) \cdot \mathrm{sinc}^2(\pi/N)}$$

the numerator of '2' accounts for the noise down-conversion from both lower and upper sidebands around the RF carrier, whereas the sinc factors in the denominator model the noise folding from higher-order intermodulation products of the $F_{LO}$ and $F_{IF}$ clocks.

Regarding the noise from $R_B$: In some embodiments, each path has a termination resistor, $R_B$. Given the non-overlapping nature of the $F_{LO}$ and $F_{IF}$ clocks, in some embodiments, the noise from one signal path does not propagate to the other paths, so they are orthogonal in time, in some embodiments. Since the resistors are physically different, their noise is uncorrelated in some embodiments. Therefore, the noise from one path can be studied, and then the noise powers can be summed-up for all paths with corresponding weights for harmonic recombination and sideband separation.

Figure 18:
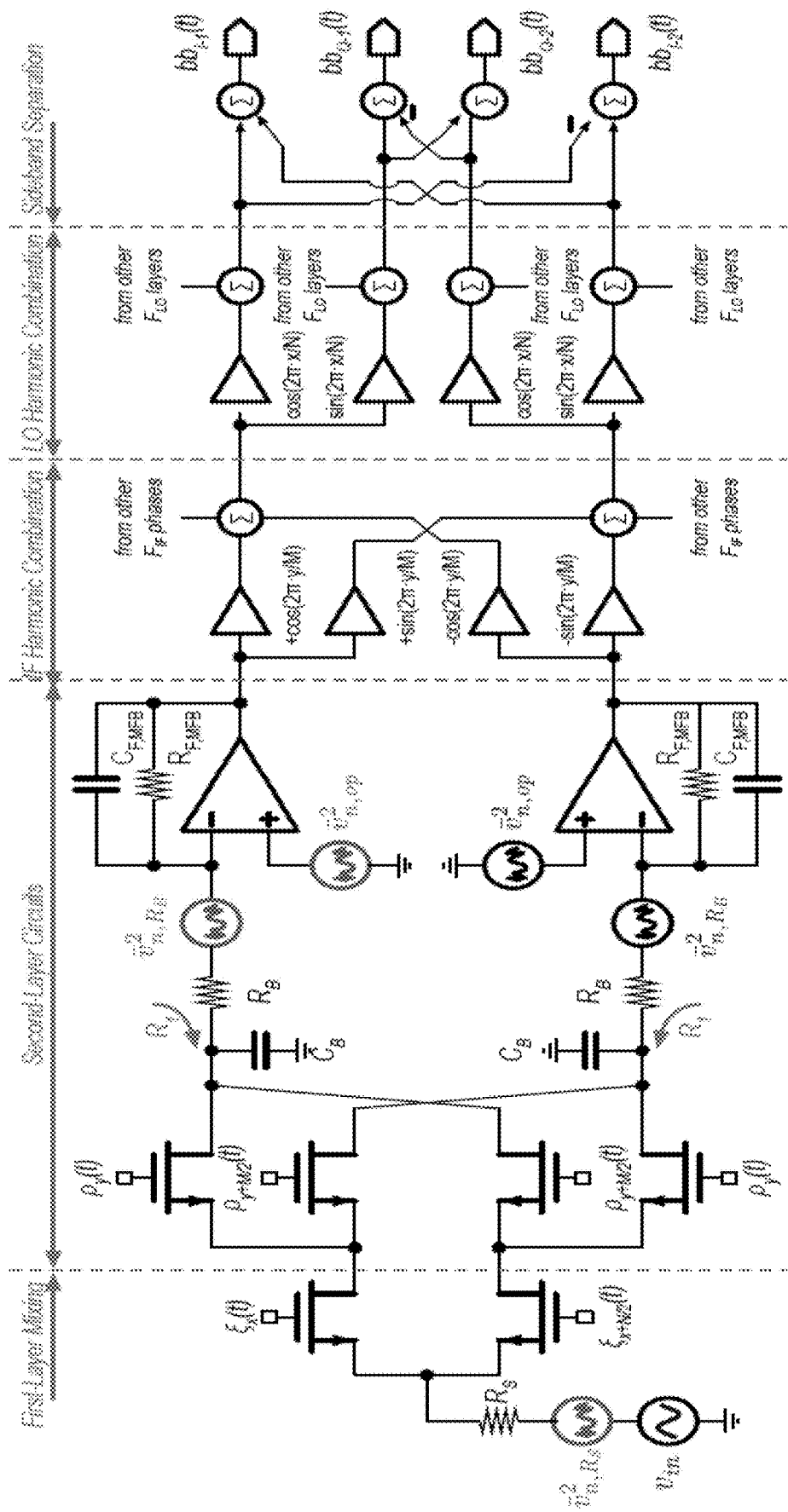
FIG. 18 is an example of model of a double-layer mixer-first branch in accordance with some embodiments.

FIG. 18 shows an example simplified schematic of the (x, y)$^{th}$ path, in some embodiments. The noise of $R_B$ can be modelled with a series voltage source, which only conducts noise current when $\xi_x(t)\cdot\rho_y(t)$ is high or when $\xi_{x+N/2}(t)\cdot\rho_{y+M/2}(t)$ is high, in some embodiments. The average resistance looking back into the mixer network at baseband, $R_1$, is then:

$$R_1 = \frac{NM}{2} \cdot (R_S + 2R_{SW}) \quad (36)$$

Since $\xi_x(t)$ and $\rho_y(t)$ have duty cycles of 1/N and 1/M, respectively, $\xi_x(t)\cdot\rho_y(t)$ has a duty cycle of 1/(NM) for the period whose value is the inverse of the least common multiple (LCM) of the $F_{LO}$ and the $F_{IF}$ clock frequencies. Similarly, $\xi_{x+N/2}(t)\cdot\rho_{y+M/2}(t)$ also has a duty cycle of 1/(NM) over the same period. Within the desired, baseband channel frequencies, $C_B$ is open and $R_1$ becomes (NM/2)·($R_S+2R_{SW}$). At higher frequencies, $C_B$ can be considered as a short circuit to ground, in some embodiments.

Thus, the output noise due to $R_B$ in the $(x, y)^{th}$ path is:

$$\frac{\overline{v_{no,R_B(x,y)}^2}}{\Delta f} = \frac{\overline{v_{n,R_B}^2}}{\Delta f} \cdot \left[\frac{R_{F,MFB}}{R_B + R_1} \cdot \cos\left(\frac{2\pi}{N}x - \frac{2\pi}{M}y\right)\right]^2 \quad (37)$$

where $\overline{v_{n,R_B}^2}/\Delta f = 4kT R_B$, and the cos factor is the coefficient due to harmonic recombination and sideband separation, in some embodiments.

Utilizing the orthogonal and uncorrelated properties, in some embodiments, the total output noise due to all $R_B$'S is then:

$$\frac{\overline{v_{no,R_B}^2}}{\Delta f} = \sum_{x=0}^{N/2-1}\sum_{y=0}^{M-1} \frac{\overline{v_{no,R_B(x,y)}^2}}{\Delta f} = \frac{\overline{v_{n,R_B}^2}}{\Delta f} \cdot \frac{NM}{4} \cdot \left(\frac{R_{F,MFB}}{R_B + R_1}\right)^2 \quad (38)$$

Regarding the noise from baseband op-amps in the TIAs: In some embodiments, the noise of the baseband op-amps in the TIAs can be modelled as noise voltage sources at their non-inverting input (FIG. 18), and the analysis is similar to that for $R_B$. In some embodiments, the output noise due to the op-amp in the $(x, y)^{th}$ path is:

$$\frac{\overline{v_{no,op(x,y)}^2}}{\Delta f} = \frac{\overline{v_{n,op}^2}}{\Delta f} \cdot \left[\left(1 + \frac{R_{F,MFB}}{R_B + R_1}\right) \cdot \cos\left(\frac{2\pi}{N}x - \frac{2\pi}{M}y\right)\right]^2 \quad (39)$$

where $\overline{v_{n,op}^2}/\Delta f = 4kT\gamma/G_{m,op}$. In some embodiments, the total output noise due to all the baseband op-amps is then:

$$\frac{\overline{v_{no,op}^2}}{\Delta f} = \sum_{x=0}^{N/2-1}\sum_{y=0}^{M-1} \frac{\overline{v_{no,op(x,y)}^2}}{\Delta f} = \frac{\overline{v_{n,op}^2}}{\Delta f} \cdot \frac{NM}{4} \cdot \left(1 + \frac{R_{F,MFB}}{R_B + R_1}\right)^2 \quad (40)$$

The noise factor of the mixer-first branch in a single-ended-differential realization, $F'_{MFB,N-M}$, can be derived, in some embodiments, by comparing the total output noise with the output noise due to $R_S$ as follows:

$$F'_{MFB,N-M} = \frac{\frac{\overline{v_{no,R_S}^2}}{\Delta f} + \frac{\overline{v_{no,R_{SW}}^2}}{\Delta f} + \frac{\overline{v_{no,R_B}^2}}{\Delta f} + \frac{\overline{v_{no,op}^2}}{\Delta f}}{2 \cdot \frac{\overline{v_{n,R_S}^2}}{\Delta f} \cdot \left(\frac{2R_{SW} + 2\eta R_B}{R_S + 2R_{SW} + 2\eta R_B} \cdot CG'_{MFB,N-M}\right)^2} \approx$$

$$\frac{1}{\mathrm{sinc}^2(\pi/N) \cdot \mathrm{sinc}^2(\pi/M)} \cdot \left\{ 1 + \frac{2R_{SW}}{R_S} + \frac{R_B}{R_S} \cdot \frac{2}{NM} + \frac{\gamma}{G_{m,op}R_S} \cdot \frac{2}{NM} \cdot \left[1 + \frac{(R_S + 2R_{SW}) \cdot (NM/2) + R_B}{R_{F,MFB}}\right]^2 \right\} \quad (41)$$

The double-sideband noise factor is used here since its value is the same as the single-sideband noise factor after image rejection is performed, in some embodiments.

In some embodiments, the image rejection can be performed in the digital domain using the down-converted I/Q baseband signals.

In some embodiments, the sinc factors approach unity when the numbers of clock phases increase, and when N=M=8, the noise factor becomes:

$$F'_{MFB,8-8} \approx \frac{1}{\mathrm{sinc}^4(\pi/8)} \cdot \quad (42)$$

$$\left\{ 1 + \frac{2R_{SW}}{R_S} + \frac{R_B}{32 \cdot R_S} \cdot \frac{\gamma}{32 \cdot G_{m,op}R_S} \cdot \left[1 + \frac{32 \cdot (R_S + 2R_{SW}) + R_B}{R_{F,MFB}}\right]^2 \right\}$$

Similarly, in some embodiments, the noise factor of a fully-differential realization, $F''_{MFB,N-M}$, for N=M=8 can be derived as:

$$F''_{MFB,8-8} \approx \frac{1}{\mathrm{sinc}^4(\pi/8)} \cdot \quad (43)$$

$$\left\{ 1 + \frac{4R_{SW}}{R_S} + \frac{R_B}{8 \cdot R_S} \cdot \frac{\gamma}{8 \cdot G_{m,op}R_S} \cdot \left[1 + \frac{8 \cdot (R_S + 4R_{SW}) + R_B}{R_{F,MFB}}\right]^2 \right\}$$

Because of the time-varying nature of the passive mixers, mixer-first designs in some embodiments may face challenges of harmonic folding, meaning that undesired signals at clock harmonics can fold to the desired signal band. For standard, single-layer mixer-first branches using N-phase clocks at $F_{LO}$, the harmonic folding rejection ratio (HFRR) is the ratio of the gain of the wanted RF signals to the gain of the unwanted RF signals that fold back on top of the desired signal band:

$$HFRR_n = \left|\frac{\mathrm{sinc}(\pi/N)}{\mathrm{sinc}(n\pi/N)}\right| \quad (44)$$

where $n = kN \pm 1$ and $k \in \mathbb{Z}$, and k is any integer. For the double-layer mixer-first branch, in some embodiments, to the first order, its HFRR can be obtained by multiplying two HFRR expressions:

$$HFRR_{n,m} = \left|\frac{\mathrm{sinc}(\pi/N)}{\mathrm{sinc}(n\pi/N)} \cdot \frac{\mathrm{sinc}(\pi/M)}{\mathrm{sinc}(m\pi/M)}\right| \quad (45)$$

where $n=k_1 N \pm 1$, $m=k_2 M \pm 1$, and $k_1, k_2 \in \mathbb{Z}$. Increasing the number of clock phases, especially for the Fw clocks, can be used to mitigate harmonic folding in some embodiments. For example, in some embodiments, when N=M=8, $F_{LO}$=700 MHz and $F_{IF}$=150 MHz, the response at |$F_{LO}$−9$F_{IF}$|=650 MHz will be folded back to the lower-carrier baseband output, whereas the response at |$F_{LO}$−7$F_{IF}$|=350 MHz will be folded back to the higher-carrier baseband output. Using a larger M (e.g., 16 and higher) eliminates these two responses but at the cost of reducing the maximum RF operating frequency and increasing the dynamic switch power due to the parasitics from the switching devices, in some embodiments.

In some embodiments, from equation (41), while the number of baseband branches increases as N, M increases, the overall noise performance can be kept constant by scaling down the individual TIA op-amps and their feedback capacitors, and scaling up their feedback resistance. This is because noise adds in power, whereas signal adds in voltage.

When the number of clock phases increases, designers can choose to keep the mixer-switch sizes the same or choose to reduce the mixer-switch size in some embodiments. In the latter case, the mixer-clock dynamic power may stay constant to the first order since the total switch size remains the same, in some embodiments. However, smaller mixer switches may have larger $R_{SW}$, resulting in a higher out-of-band impedance and less out-of-band blocker filtering, in some embodiments. To maintain good out-of-band filtering, in some embodiments, the switches may be kept at the same size; however, as their number increases with the number of clock phases, the mixer-clock dynamic power may increase and require stronger clock buffers, in some embodiments.

Frequency translations in high-performance, current-mode receivers are usually realized by converting the RF voltage to current with LNTAs and then translating the RF information to baseband with passive mixers in the current domain. In accordance with some embodiments, if the LNTA transconductance is periodically modulated, another frequency translation can be realized during the RF voltage-to-current conversion.

Figure 19:
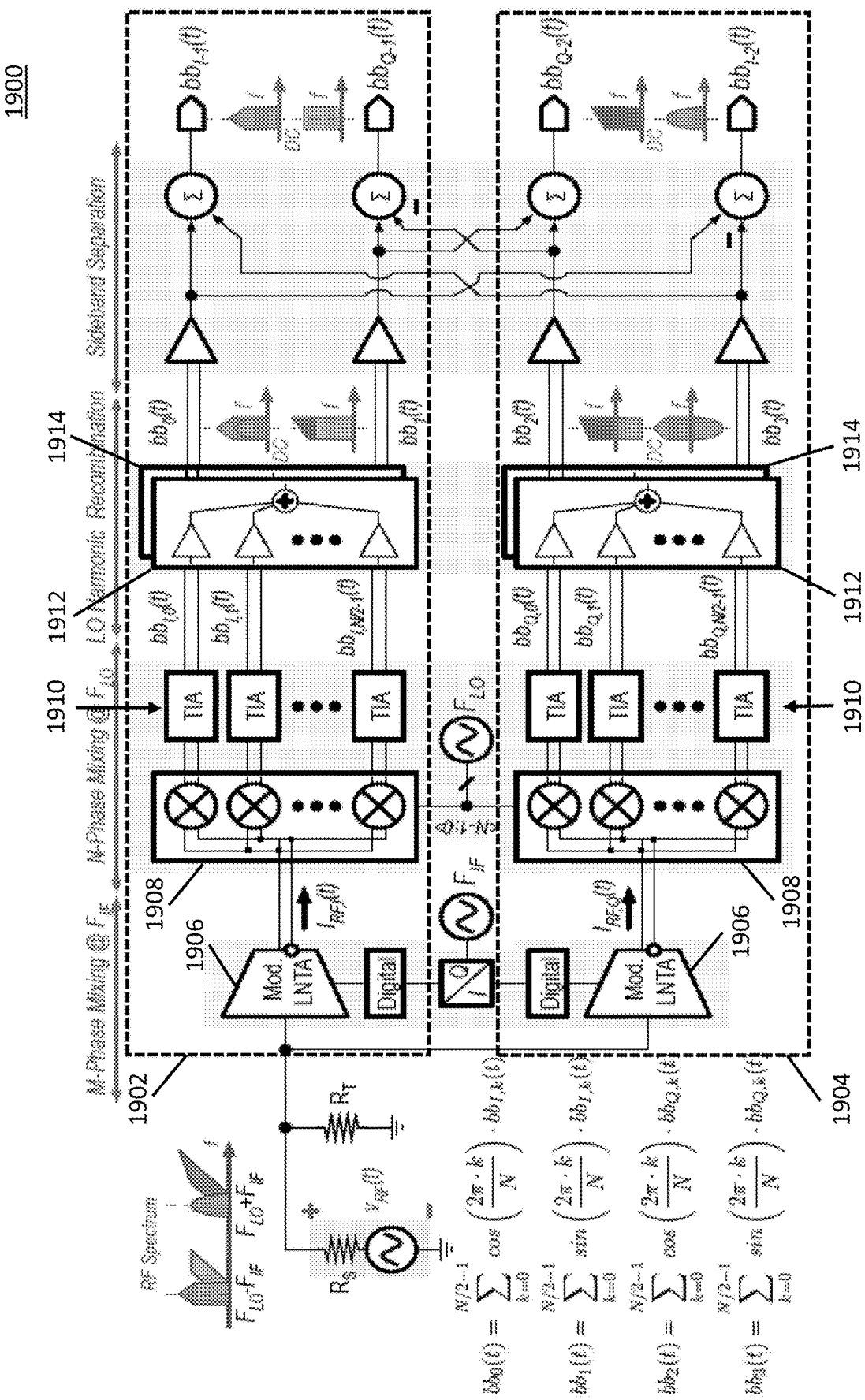
FIG. 19 is an example of a block diagram of two quadrature-modulated low noise transconductance amplifier (LNTA) branches in accordance with some embodiments.

In FIG. 19, in accordance with some embodiments, two quadrature-modulated LNTA branches 1902 and 1904 are shown, where each branch includes an M-phase-modulated LNTA 1906 and N-phase, current-mode mixers 1908, followed by baseband TIAs 910 and two harmonic recombination circuits 1912 and 1914. In some embodiments, N and M can be any suitable positive integer values. More particularly, in some embodiments, N and M can be integers that are powers of two (e.g., 4, 8, 16, 32, 64, etc.).

Figure 20:
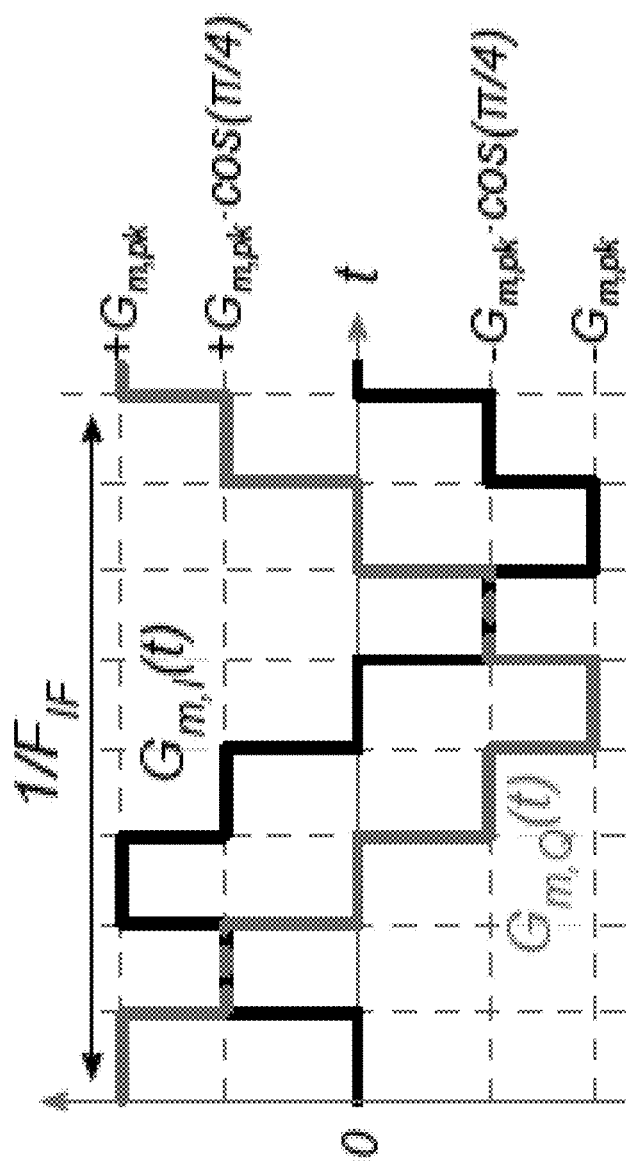
FIG. 20 is an example of a graph showing modulation of a transconductor in accordance with some embodiments.

As shown in FIG. 20, in accordance with some embodiments, the two modulated LNTAs can have sinusoidally-varying transconductances, $G_{m,I}(t)$ and $G_{m,Q}(t)$, in quadrature at $F_{IF}$. The two modulated LNTAs can operate as switched-$G_m$ mixers to translate $V_{RF}(\omega)$ at $(F_{LO} \pm F_{IF})$ to $I_{RF,I}(\omega)$ and $I_{RF,Q}(\omega)$ at $F_{LO}$, which are then translated to baseband with passive mixers driven at $F_{LO}$. These baseband currents can be converted to voltages with TIAs and are further harmonically re-combined to form four baseband signals, $V_{BB0}(\omega)$ to $V_{BB3}(\omega)$, while rejecting higher-order $F_{LO}$ harmonics, in some embodiments. The I/Q components from both RF carriers can be simply separated from these four baseband signals using addition and subtraction circuits, in some embodiments.

Figure 21:
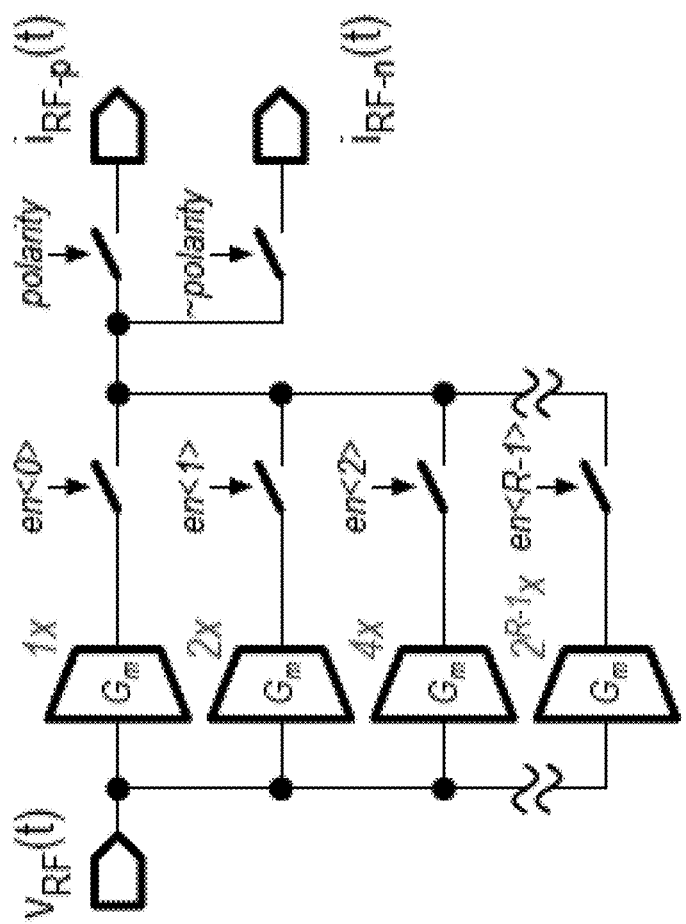
FIG. 21 is an example of a behavioral model of modulated LNTAs in a single-ended-differential implementation in accordance with some embodiments.

FIG. 21 is an example of a behavioral model of modulated LNTAs in a single-ended-differential implementation in accordance with some embodiments.

In some embodiments, the transconductance conversion gain of the modulated LNTAs, $G_{m,EQ}$, can be defined as the ratio of $I_{RF,I}(\omega)$ at $F_{LO}$ to $V_{RF}(\omega)$ at $(F_{LO} \pm F_{IF})$ and is the fundamental Fourier series coefficient of $G_{m,I}(t)$:

$$G_{m,EQ} \equiv \frac{I_{RF,I}}{V_{RF}} = \frac{1}{2} \cdot G_{m,pk} \cdot \text{sinc}(\pi/M) \quad (46)$$

where M is the number of the LNTA modulation phases, and $G_{m,pk}$ is the peak LNTA transconductance. To derive closed-form expressions for gain and noise performance, it can be assumed that both $G_{m,I}(t)$ and $G_{m,Q}(t)$ are the discrete-time approximations of the sinusoids with un-quantized transconductance, in some embodiments. $I_{RF,I}(\omega)$ at $F_{LO}$ is then translated and converted to the voltage $V_{BB0}(\omega)$ at baseband by the transimpedance conversion gain is:

$$R_{EQ} \equiv \frac{V_{BB0}}{I_{RF,I}} = G_{MX,LO} R_{F,LB} \cdot \frac{N}{2} \quad (47)$$

$$= \frac{1}{2} \cdot R_{F,LB} \cdot \text{sinc}(\pi/N)$$

where $R_{F,LB}$ is the TIA feedback resistance, and $G_{MX,LO} = (1/N)\text{sinc}(\pi/N)$ is the mixer current conversion gain, in some embodiments. Here un-quantized, baseband weightings in the harmonic rejection circuits are also assumed. After sideband separation, in some embodiments, the conversion gain doubles and is:

$$CG'_{LB,N-M} \equiv \frac{V_{BB,I-1}}{V_{RF}} = G_{m,EQ} R_{EQ} \cdot 2 \quad (48)$$

$$= \frac{1}{2} \cdot G_{m,pk} R_{F,LB} \cdot \text{sinc}(\pi/N) \cdot \text{sinc}(\pi/M).$$

As N, M increase, both sinc factors approach unity, and there will be less noise folding from higher-order harmonics and better harmonic suppression across the RF spectrum, in some embodiments. In some embodiments, if needed, a fully-differential implementation can be used to suppress common-mode interferences; its conversion gain is the same as that for the single-ended-differential implementation.

In some embodiments, input impedance matching in the receiver is provided by the double-layer mixer-first branches. For a noise analysis of the LNTA branches of FIG. 19, in some embodiments, the impedance matching of the double-layer mixer first branches can be modeled with a resistor $R_T$ (as shown in FIG. 19) that is equal to $R_S$ for broadband matching. In a well-designed current-mode receiver, the LNTAs can have a high output impedance in some embodiments.

In some embodiments, $R_S$, $R_T$, and the modulated LNTAs are the significant noise sources, while the noise from passive mixers, TIA feedback resistors, and TIA op-amps do not significantly contribute to the overall noise.

Regarding the noise from $R_S$ and $R_T$: These noise sources share the same noise transfer function to the branch output, in some embodiments. In some embodiments, the noise contribution for $R_S$ is:

$$\frac{\overline{v_{no,RS}^2}}{\Delta f} = \frac{\overline{v_{n,RS}^2}}{\Delta f} \cdot \left(\frac{CG'_{LB,N-M}}{2}\right)^2 \cdot \frac{2}{\text{sinc}^2(\pi/N) \cdot \text{sinc}^2(\pi/M)} \quad (49)$$

where $\overline{v_{nR_S}^2}/\Delta f = 4 kT R_S$, the factor of (½) stems from the fact that the noise process experiences a voltage division between $R_S$ and $R_T$ at the LNTA's input, and the two sinc factors are derived from noise folding.

Figure 22:
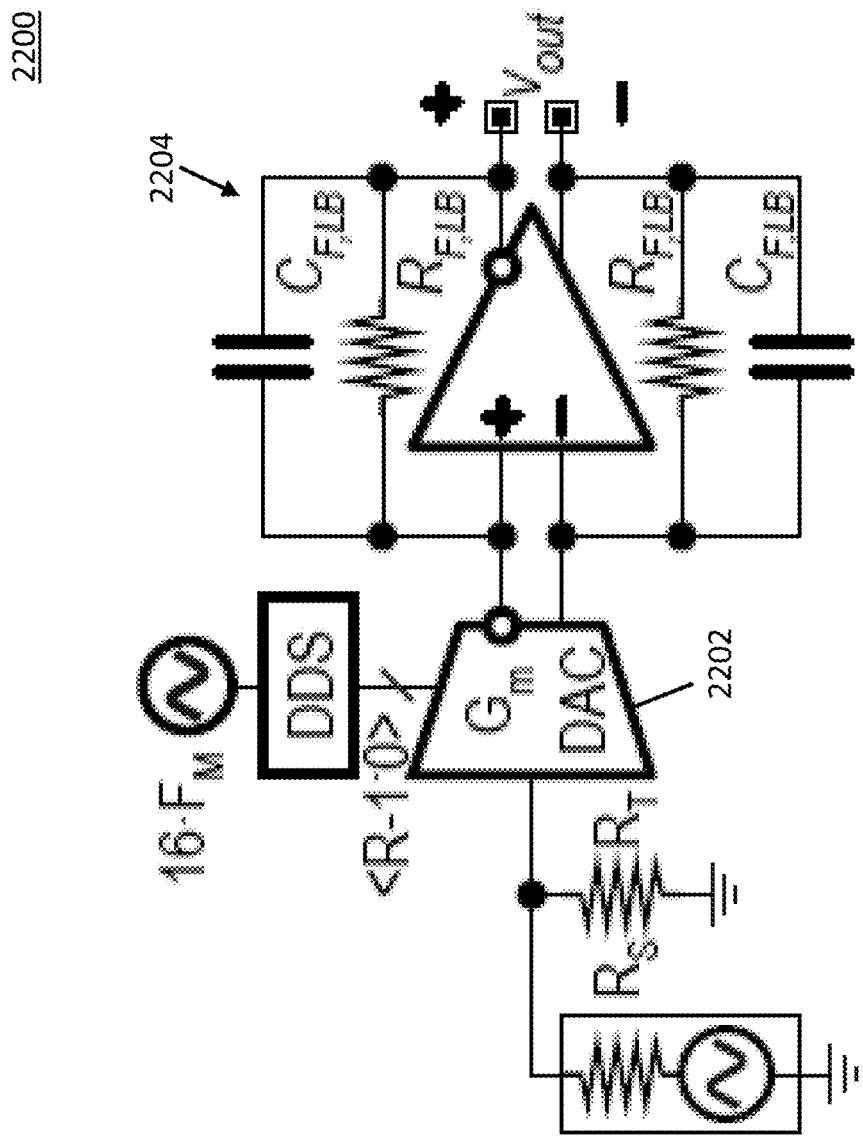
FIG. 22 is an example of a model of part of an LNTA branch in accordance with some embodiments.

Regarding the noise from modulated LNTAs: To understand the noise of modulated LNTAs in the overall signal branch, consider circuit 2200 in FIG. 22, in which modulated LNTA 2202 is directly followed by a baseband TIA 2204. Circuit 2200 down-converts the signals at $F_{IF}$ to baseband, while rejecting other higher-order $F_{IF}$ clock harmonics.

Figure 23:
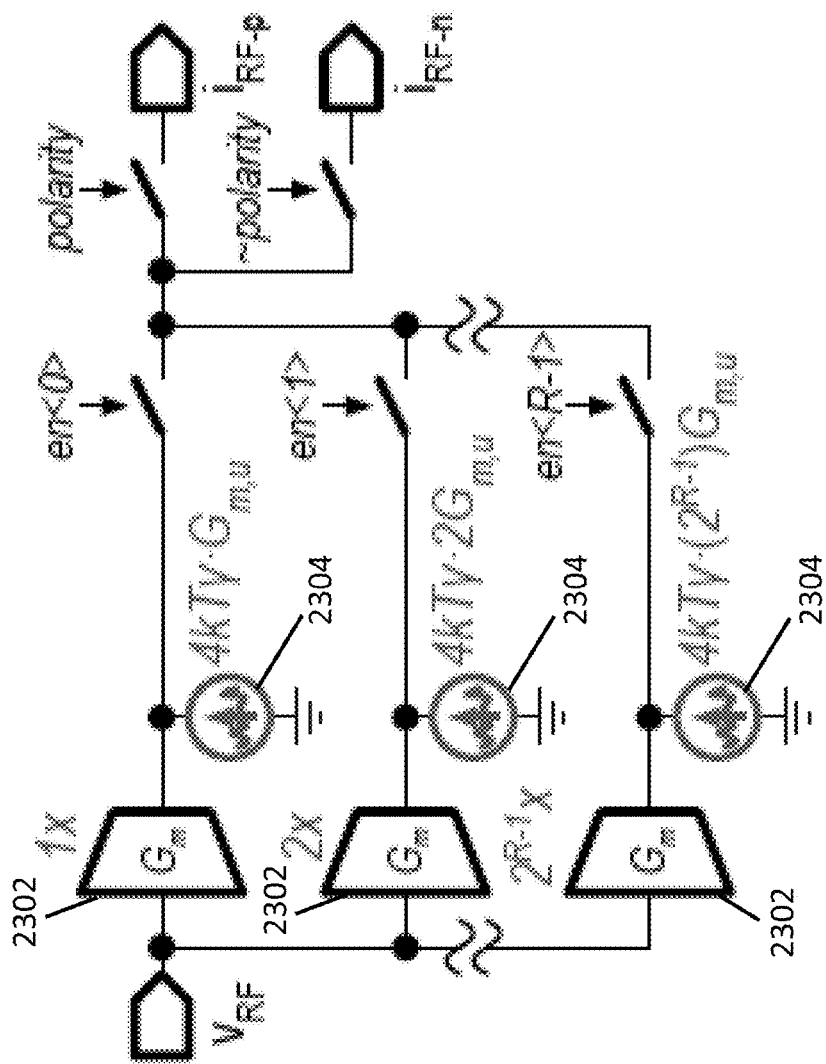
FIG. 23 is an example of a model of a modulated LNTA in accordance with some embodiments.

As shown in FIG. 23, in some embodiments, modulated LNTA 2202 can be implemented in some embodiments as a set of switched unit cells 2302. The noise of each unit cell 2302 can be modelled as a shunt noise current source 2304 at the cell output as shown in FIG. 23, in some embodiments. If a unit cell is used during LNTA modulation, its noise current appears at the TIA virtual ground and develops a noise voltage at the TIA output, in some embodiments. Otherwise, if the cell is not used during modulation, it does not contribute noise, in some embodiments.

Figure 24:
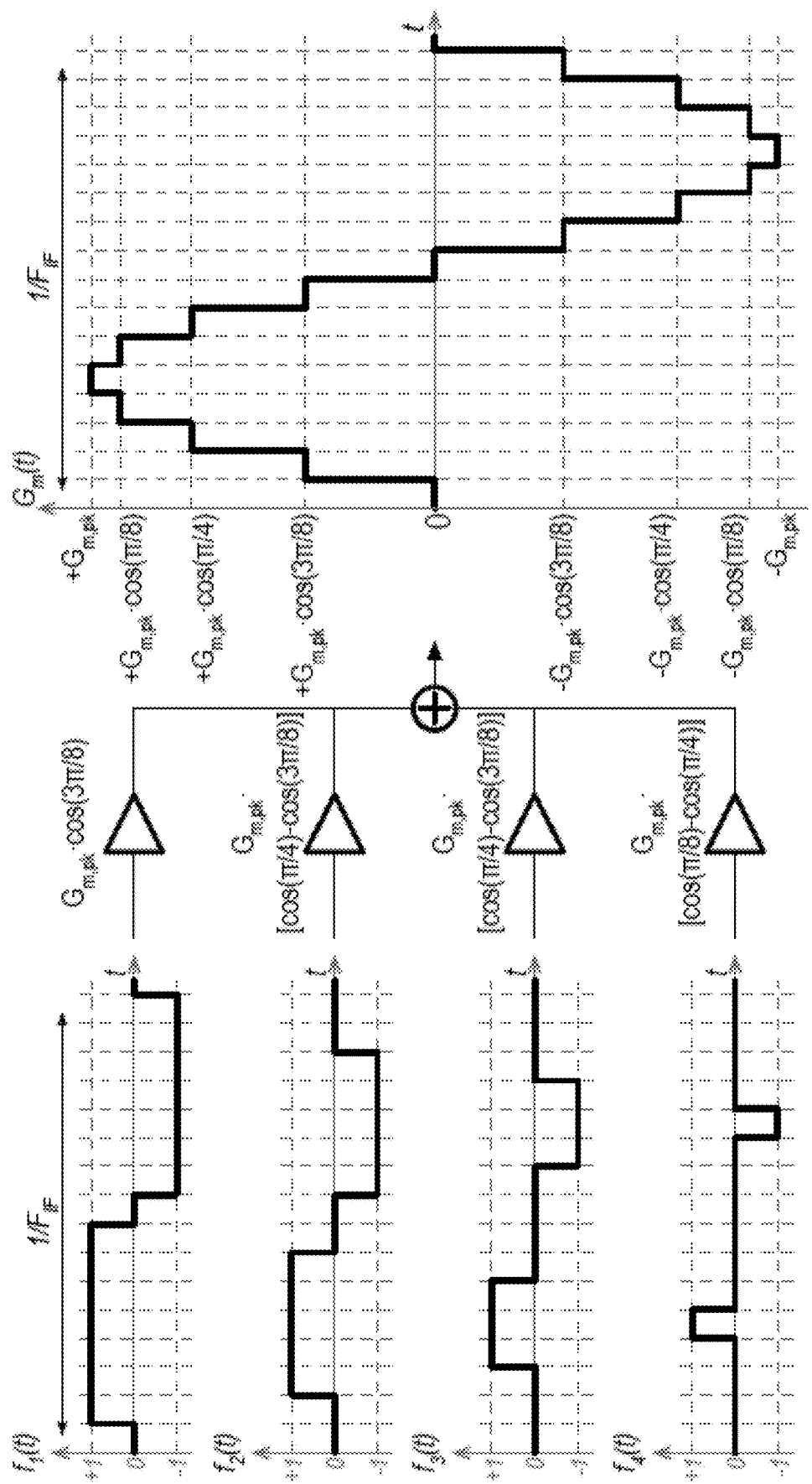
FIG. 24 is an example of graphs showing decomposition of a 16-phase modulated transconductance into four {−1,0, 1} component waveforms in accordance with some embodiments.

Since the noise of each unit cell is un-correlated, these unit cells can then be re-organized, in some embodiments. Their equivalent, noise power spectral densities (PSDs) can be calculated from the sum of the individual noise PSDs, in some embodiments. Thanks to the sinusoidal symmetry, one can then: decompose $G_{m,i}(t)$ into four components, $f_1(t)$ to $f_4(t)$, as shown in FIG. 24, with corresponding sinusoidal weights; compute the noise contribution of each component; and sum these contributions, in some embodiments. Using Parseval's theorem, the noise PSD can be derived from the integral of the square of a time-domain function over its period, in some embodiments. In some embodiments, the noise contribution at TIA output due to $f_1(t)$ is:

$$\frac{\overline{v_{n,f_1}^2}}{\Delta f} = 4kT\gamma G_{m,pk} \cos\left(\frac{3\pi}{8}\right) \cdot \frac{1}{T_{IF}} \int_0^{T_{IF}} |f_1(t)|^2 dt \cdot R_{F,LB}^2 \quad (50)$$

$$= 4kT\gamma G_{m,pk} \cos\left(\frac{3\pi}{8}\right) \cdot \frac{7}{8} \cdot R_{F,LB}^2.$$

Similarly, in some embodiments, the contributions of the other components can be computed; all four contributions can be summed to find the total noise PSD:

$$\frac{\overline{v_{n,G_m}^2}}{\Delta f} = \qquad (51)$$

$$\sum_{k=1}^{4} \frac{\overline{v_{n,f_k}^2}}{\Delta f} = 4kT\gamma G_{m,pk} \cdot R_{F,LB}^2 \cdot \frac{1}{8}\left[1 + 2\cos\left(\frac{\pi}{8}\right) + 2\cos\left(\frac{\pi}{4}\right) + 2\cos\left(\frac{3\pi}{8}\right)\right].$$

This expression includes the noise converted not only from the fundamental clock frequency at $F_{IF}$, but also from higher-order clock harmonics (e.g., 15th and 17th $F_{IF}$ harmonics), in some embodiments. In some embodiments, this 16-phase result can be generalized to an M-phase modulated LNTA, where in practice $M=2^k$ with $k \in Z$ and $k \geq 2$, by decomposing its transconductance waveform into M/4 components and summing their contributions:

$$\frac{\overline{v_{n,G_m}^2}}{\Delta f} = 4kT\gamma G_{m,pk} R_{F,LB}^2 \cdot \frac{2}{M} \sum_{k=0}^{M/2-1} \left|\cos\left(\frac{2\pi}{M}k\right)\right|. \quad (52)$$

For convenience, equation (52) can be referred to the TIA input as:

$$\frac{\overline{i_{n,G_m}^2}}{\Delta f} = 4kT\gamma G_{m,pk} \cdot \frac{2}{M} \sum_{k=0}^{M/2-1} \left|\cos\left(\frac{2\pi}{M}k\right)\right|. \quad (53)$$

Getting back to the overall signal branch in FIG. 19, the quadrature-modulated LNTAs 1906 are followed by N-phase passive mixers 1908, baseband TIAs 1910, and harmonic-recombining circuits 1912 and 1914. In some embodiments, extra noise may be down-converted from higher-order $F_{LO}$ harmonics. In terms of noise process, the signal branch down-converts the noise from $(nF_{LO}+mF_{IF})$ to baseband, where $n=k_1N\pm 1$, $m=k_2M\pm 1$, and $k1, k2 \in Z$. In some embodiments, the resulting total noise at $V_{BB,I-1}$ in FIG. 19 is then:

$$\frac{\overline{v_{no,G_m}^2}}{\Delta f} = 2 \cdot \frac{\overline{i_{n,G_m}^2}}{\Delta f} \cdot R_{EQ}^2 \cdot \frac{2}{\text{sinc}^2(\pi/N)} \quad (54)$$

where the factor of '2' is due to the fact that two modulated LNTAs are used, and the sinc factor stems from the noise folding from the higher-order $F_{LO}$ clock harmonics. Substituting (53) and (47) into (54), in some embodiments, the following is obtained:

$$\frac{\overline{v_{no,G_m}^2}}{\Delta f} = \qquad (55)$$

$$\frac{\overline{v_{n,G_{m,pk}}^2}}{\Delta f} \cdot (CG'_{LB,N-M})^2 \cdot \frac{4}{M} \sum_{k=0}^{M/2-1} \left|\cos\left(\frac{2\pi}{M}k\right)\right| \cdot \frac{2}{\text{sinc}^2(\pi/M) \cdot \text{sinc}^2(\pi/M)}$$

$$\text{where } \overline{v_{n,G_{m,pk}}^2}/\Delta f = 4kT\gamma/G_{m,pk}.$$

In some embodiments, the noise factor of the quadrature-modulated LNTA branches, $F'_{LB,N-M}$, can now be derived as:

$$F'_{LB,N-M} = \frac{\frac{\overline{v_{no,R_S}^2}}{\Delta f} + \frac{\overline{v_{no,R_T}^2}}{\Delta f} + \frac{\overline{v_{no,G_m}^2}}{\Delta f}}{2 \cdot \frac{\overline{v_{no,R_S}^2}}{\Delta f} \cdot \left(\frac{1}{2} CG'_{LB,N-M}\right)^2} = \qquad (56)$$

$$\frac{1}{\text{sinc}^2(\pi/M) \cdot \text{sinc}^2(\pi/M)} \cdot \left[2 + \frac{4\gamma}{G_{m,pk}R_S} \cdot \frac{4}{M} \sum_{k=0}^{M/2-1} \left|\cos\left(\frac{2\pi}{M} \cdot k\right)\right|\right]$$

If 8-phase-modulated LNTAs are used with 8-phase HR down-conversion circuits (i.e., N=M=8), in some embodiments, (56) reduces to:

$$F'_{LB,8-8} = \frac{1}{\text{sinc}^4(\pi/8)} \cdot \left\{2 + \frac{2\gamma}{G_{m,pk}R_S} \cdot \left[1 + 2\cos\left(\frac{\pi}{4}\right)\right]\right\} \quad (57)$$

Similarly, in some embodiments, the noise factor of a fully-differential implementation, $F''_{LB,N-M}$, for N=M=8 can be derived as:

$$F''_{LB,8-8} = \frac{1}{\text{sinc}^4(\pi/8)} \cdot \left\{2 + \frac{4\gamma}{G_{m,pk}R_S} \cdot \left[1 + 2\cos\left(\frac{\pi}{4}\right)\right]\right\} \quad (58)$$

In some embodiments, the previous parts assume that the modulated LNTAs produce un-quantized transconductance, and that the harmonic recombination networks apply un-quantized weights to $bb_{I,i}(t)$ and $bb_{Q,i}(t)$. In practice, both weights are realized in a quantized manner. For modulated LNTAs, quantization errors result in undesired harmonic responses at higher-order $F_{IF}$ harmonics. The harmonic rejection ratio (HRR) is the ratio of transconductance conversion gain at $F_{IF}$ to the transconductance conversion gain at the $i^{th}$ harmonic:

$$HRR_i \equiv \left|\frac{G_{m,EQ}}{G_{m,i}}\right| = \left|\frac{\frac{1}{T_{IF}}\int_0^{T_{IF}} G_{m,I}(t)\exp(1\cdot j\omega_{IF}t)dt}{\frac{1}{T_{IF}}\int_0^{T_{IF}} G_{m,I}(t)\exp(i\cdot j\omega_{IF}t)dt}\right|. \quad (59)$$

For M=8, in some embodiments, (59) reduces to $$HRR_i = \left|\frac{\mathrm{sinc}(\pi/8)}{\mathrm{sinc}(i\pi/8)}\right| \cdot \left|\frac{1+2\rho_{IF}\cdot\cos(\pi/4)}{1+2\rho_{IF}\cdot\cos(i\pi/4)}\right| \quad (60)$$

where $\rho_{IF}$ is the ratio of the mid-level transconductance to the peak LNTA transconductance and should be $\cos(\pi/4)$, ideally. Due to quantization errors, it will deviate from this ideal value, resulting in a finite HRR and undesired signals around the $F_{IF}$ clock harmonics being down-converted on top of the desired signals, in some embodiments. For 4-bit resolution, the modulated LNTAs offer 36.7 dB $HRR_3$ and 41.1 dB $HRR_5$, in some embodiments. Once improved to 5-bit resolution, the LNTAs now provide 56.7 dB $HRR_3$ and 61.1 dB $HRR_5$, in some embodiments. Using a finer resolution or a larger M, in some embodiments, will lead to a higher HRR, in some embodiments. Similarly, in some embodiments, the HRR for M-phase-modulated LNTAs is:

$$HRR_i = \left|\frac{\mathrm{sinc}(\pi/M)}{\mathrm{sinc}(i\pi/M)}\right| \cdot \frac{\sum_{k=0}^{M/2-1}\left|\rho_{IF,k}\cdot\cos\left(\frac{2\pi}{M}k\right)\right|}{\sum_{k=0}^{M/2-1}\left|\rho_{IF,k}\cdot\cos\left(i\frac{2\pi}{M}k\right)\right|} \quad (61)$$

where $\rho_{IF,k}$ should be $\cos(2\pi k/M)$, ideally. For the whole signal branch, harmonic rejection happens in both the $F_{LO}$ and the $F_{IF}$ clock domains, in some embodiments. To the first order, its HRR can be obtained by multiplying two HRR expressions, in some embodiments. In some embodiments, for N=M=8, it is:

$$HRR_{n,m} = \qquad (62)$$
$$\left|\frac{\mathrm{sinc}(\pi/8)}{\mathrm{sinc}(m\pi/8)} \cdot \frac{1+2\rho_{IF}\cdot\cos(\pi/4)}{1+2\rho_{IF}\cdot\cos(m\pi/4)}\right| \cdot \left|\frac{\mathrm{sinc}(\pi/8)}{\mathrm{sinc}(n\pi/8)} \cdot \frac{1+2\rho_{LO}\cdot\cos(\pi/4)}{1+2\rho_{LO}\cdot\cos(n\pi/4)}\right|$$

where $\rho_{LO}$ is the ratio of the baseband weight used in the harmonic recombination for the $F_{LO}$ clock; n and m are the harmonic orders for the $F_{LO}$ and the $F_{IF}$ clocks, respectively. Ideally, both $\beta_{LO}$ and $\rho_{IF}$ should be $\cos(\pi/4)$, in some embodiments. Note that (62) reduces to (45) when $n=k_1 N\pm1$, $m=k_2 M\pm1$, and k1, k2$\in \mathbb{Z}$, in some embodiments. This is because the LNTA branches also employ the switching circuits for frequency translations and, thereby, face the same challenges from harmonic folding, in some embodiments.

So far, clocks have been assumed to be ideal with no phase or gain mismatches, and the analog circuits have been assumed to be perfectly phase and gain matched. In practice, non-idealities will occur, and as a result, the low-band outputs will contain signal components that are down-converted from the higher RF carrier and vice versa, in some embodiments.

Figure 25:
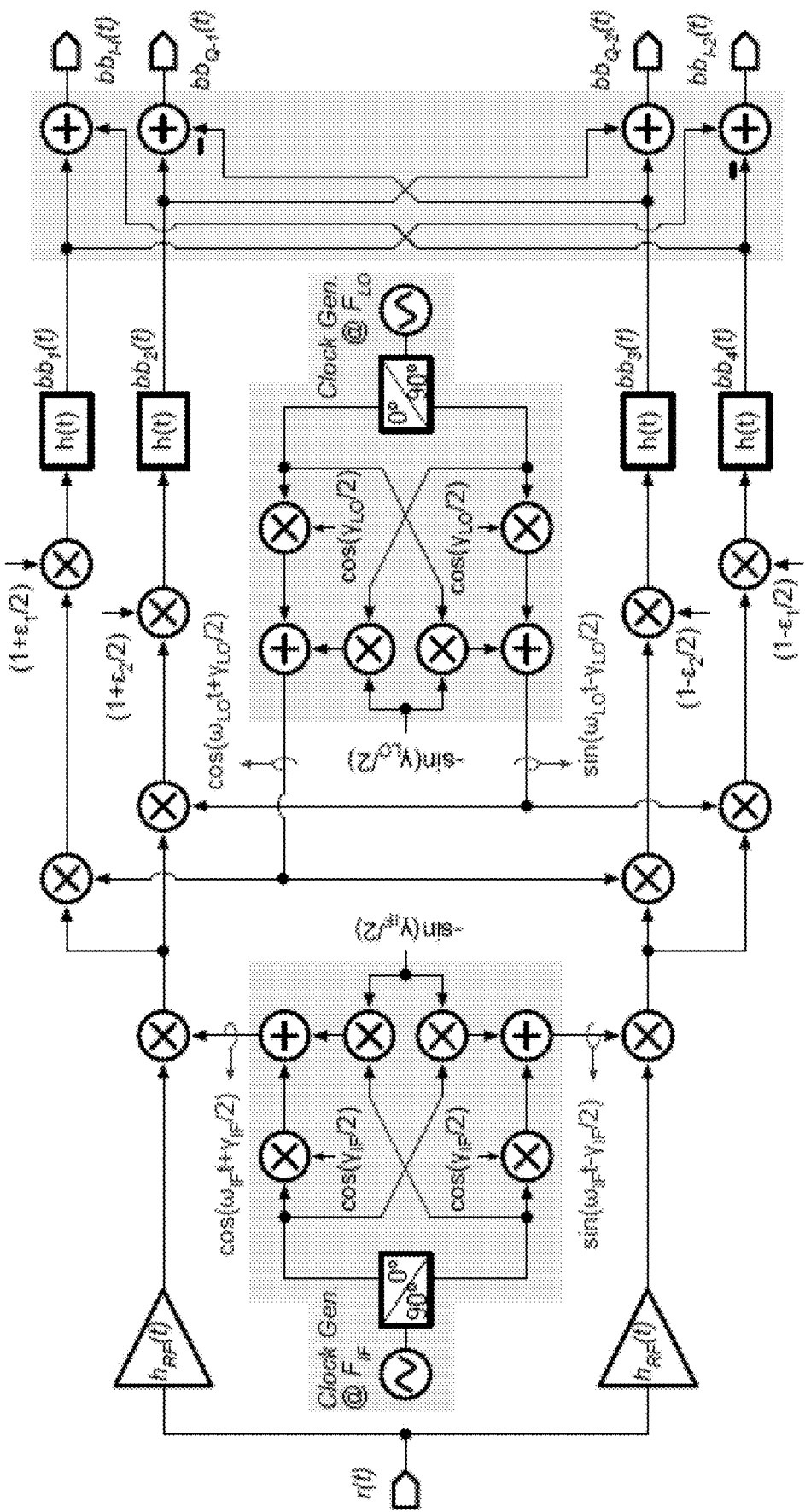
FIG. 25 is an example of a model to study the effects of gain and phase imbalances on sideband rejection in the modulated LNTA branches in accordance with some embodiments.

The model in FIG. 25 is used to study the effects of phase and gain imbalances on the sideband rejection, where $\gamma_{LO}$ and $\gamma_{IF}$ are the phase imbalances for the $F_{LO}$ and $F_{IF}$ clock domains, respectively, and $\epsilon 1$ and $\epsilon 2$ are the amplitude imbalances due to the analog circuitry, in some embodiments. For the quadrature-modulated LNTA branches, the $F_{IF}$ clocks are running at a much lower rate, compared to the $F_{LO}$ clock rate, in some embodiments. Thus, the phase imbalances due to the $F_{IF}$ clocks can be neglected by assuming $\gamma_{IF}$ is zero, in some embodiments. The sideband rejection is defined as the ratio of the down-converted signal power from the desired RF carrier to the down-converted signal power from the undesired RF carrier:

$$SBR = \frac{1+\cos[\gamma_{LO}+2\cdot a\tan(\epsilon_1/2)]}{1-\cos[\gamma_{LO}-2\cdot a\tan(\epsilon_1/2)]}. \quad (63)$$

In some embodiments, to demodulate an uncoded QAM-1024 modulated signal with a bit error ratio of $10^{-6}$, assuming that the received power levels for both carriers are the same, a minimum signal-to-noise ratio (SNR) of 39.0 dB can be used, meaning the phase imbalance can be 1 degree, while the gain imbalances can be below 0.2 dB. Note that the sideband rejection of the double-layer mixer-first branch will share the same expression since its mathematical model is the same as the model in FIG. 25, in some embodiments.

In some embodiments, as M gets large enough (e.g., above 8), the effect of noise folding can be ignored, and the noise performance will be dominated by the noise from the fundamental tone at $F_{IF}$. As M becomes very large, the noise factor in (37) approaches:

$$\lim_{M\to\infty} F'_{LB,N-M} = \frac{1}{\mathrm{sinc}^2(\pi/N)} \cdot \left(2 + \frac{4\gamma}{G_{m,pk}R_S} \cdot \frac{4}{\pi}\right) \quad (64)$$

In some embodiments, it is desirable to have a large number (e.g., 16 or above) of LNTA modulation phases for better spurious response profiles, especially when the two carriers are close to each other (i.e., when $F_{IF}$ is small).

In accordance with some embodiments, the double-layer mixer-first branch and the quadrature-modulated LNTA branches are combined to form the proposed double-conversion, noise-cancelling receiver that inherits the input matching properties of the double-layer mixer-first branch while having much better sensitivity.

Figure 26:
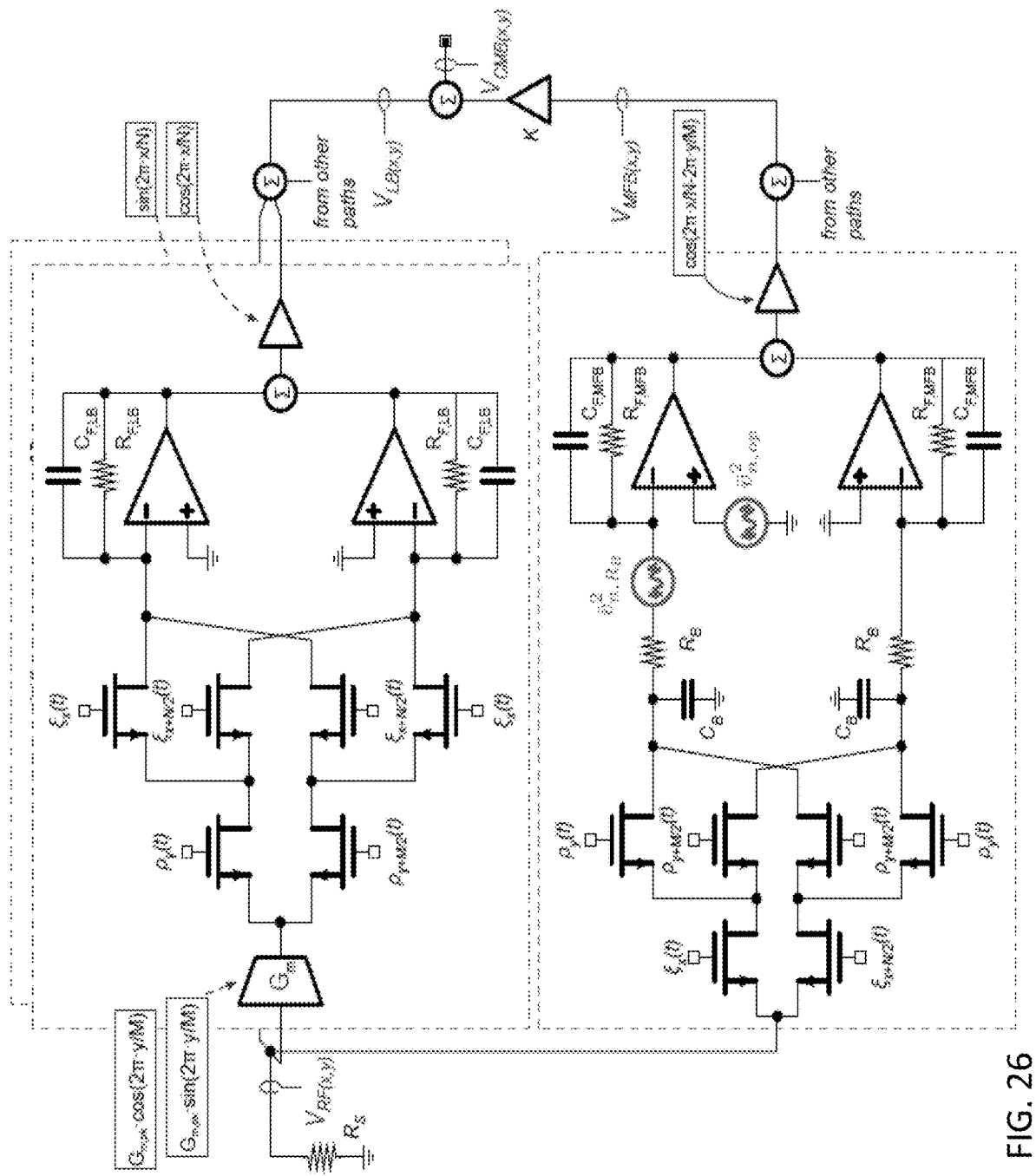
FIG. 26 is an example of a simplified schematic for the (x, y)$^{th}$ path of a double-conversion, noise cancelling receiver in accordance with some embodiments.

To derive the Noise-Cancelling (NC) condition, two observations can be made. In some embodiments, the noise of the $R_B$ resistors and the baseband op-amps from the mixer-first branch are orthogonal and un-correlated between different signal paths, allowing us to study one path and then generalize its result to all other paths. FIG. 26 can be used to study the NC condition of the $(x, y)^{th}$ path, in some embodiments, where K is the coefficient to adjust the relative gain difference between two branch outputs $V_{MFB}(x,y)$ and $V_{LB}(x,y)$.

Another observation is that, in some embodiments, random noise can be represented as a summation of a great number of equally-spaced sinusoidal tones, whose amplitudes are independent random variables distributed normally about zero, and whose phases are also independent random variables and distributed uniformly from 0 to $2\pi$. Therefore, a noise source can then be replaced with an equivalent AC source, and its AC response within the system can be studied, in some embodiments. Now, its noise source of the $R_B$ resistor in the $(x, y)^{th}$ path is replaced with $V_{n,RB}(\omega)$, in some embodiments. In some embodiments, its transfer function to $V_{MFB}(x,y)$ is:

$$\frac{V_{MFB(x,y)}(\omega)}{V_{n,R_B}(\omega)} = \quad (65)$$

$$\frac{R_{F,MFB}}{R_1 + R_B} \cdot \frac{1}{1 + j\omega R_{F,MFB} C_{F,MFB}} \cdot \frac{1 + j\omega R_1 C_B}{1 + j\omega (R_1 \| R_B) C_B} \cdot \cos\left(\frac{2\pi}{N}x - \frac{2\pi}{M}y\right)$$

where the cos factor stems from harmonic recombination and sideband separation. In some embodiments, the transfer function to $V_{BB}(x,y)$ path is:

$$\frac{V_{BB(x,y)}(\omega)}{V_{n,R_B}(\omega)} = \frac{R_1}{R_1 + R_B} \cdot \frac{1}{1 + j\omega(R_1 \| R_B) C_B} \quad (66)$$

where $R_1=(R_S+2R_{SW})\cdot(NM/2)$. From time-domain, in some embodiments, this voltage will appear at RF input during two time windows, $\xi_x(t)\cdot\rho_y(t)$ and $\xi_{x+N/2}(t)\cdot\rho_{y+M/2}(t)$. In some embodiments, from frequency-domain, it means that $V_{BB}(x,y)$ will be translated to $(pF_{LO}+qF_{IF})$ as follows:

$$V_{RF(x,y)}(\omega) = \mathcal{F}\left\{\begin{array}{c}\frac{R_S}{R_S + 2R_{SW}} \cdot \\ [\xi_x(t)\cdot\rho_y(t) + \xi_{x+N/2}(t)\cdot\rho_{y+M/2}(t)]\end{array} \cdot v_{BB}(t)\right\} \quad (67)$$

$$= \frac{R_S}{R_S + 2R_{SW}} \cdot \sum_{p=-\infty}^{+\infty}\sum_{q=-\infty}^{+\infty} \alpha_p \beta_q \cdot \{1 + \exp[-j(p+q)\pi]\} \cdot$$

$$\exp\left(-jxp\frac{2\pi}{N}\right)\cdot\exp\left(-jyq\frac{2\pi}{M}\right)\cdot V_{BB}[\omega - (p\omega_{LO} + q\omega_{IF})]$$

where (p+q) is even. This RF voltage is then seen by the modulated LNTA branches, in some embodiments. Since only the baseband components are of interest, in some embodiments, the derivations can be greatly simplified with $V_{LB}(x,y)$ given below:

$$V_{LB(x,y)}(\omega) = V_{BB(x,y)}(\omega)\cdot\frac{R_S}{R_S + 2R_{SW}}\cdot\frac{G_{m,pk}R_{F,LB}}{1 + j\omega R_{F,LB}C_{F,LB}}\cdot\cdot \quad (68)$$

$$\cos\cdot\left(\frac{2\pi}{N}x - \frac{2\pi}{M}y\right)\cdot\sum_{p=-\infty}^{+\infty}\sum_{q=-\infty}^{+\infty}|\alpha_p|^2|\beta_q|^2\cdot$$

$$\{1 + \exp[-j(p+q)\pi]\}^2$$

$$= V_{n,R_B}(\omega)\cdot G_{m,pk}R_S\cdot\frac{R_{F,LB}}{R_1 + R_B}\cdot\frac{1}{1 + j\omega(R_1 \| R_B)C_B}\cdot$$

$$\frac{1}{1 + j\omega R_{F,LB}C_{F,LB}}\cdot\cos\left(\frac{2\pi}{N}x - \frac{2\pi}{M}y\right)$$

In some embodiments, if attention is further restricted to the frequency components well within the channel (i.e., $\Delta\omega\approx 0$), $V_{CMB(x,y)}(\omega)$ becomes:

$$\frac{V_{CMB(x,y)}(\Delta\omega)}{V_{n,R_B}(\Delta\omega)} = \frac{G_{m,pk}R_S R_{F,LB} + K\cdot R_{F,MFB}}{R_1 + R_B}\cdot\cos\left(\frac{2\pi}{N}x - \frac{2\pi}{M}y\right) \quad (69)$$

where the NC condition can be found by setting (69) to zero as:

$$K'_{NC} = -1\cdot G_{m,pk}R_S\cdot\frac{R_{F,LB}}{R_{F,MFB}} \quad (70)$$

In some embodiments, following the same logic, the noise source of the baseband op-amp can be replaced with an AC source $V_{n,op}(\omega)$ and find its transfer function to $V_{CMB(x,y)}$ as:

$$\frac{V_{CMB,OP(x,y)}(\Delta\omega)}{V_{n,op}(\Delta\omega)} = \quad (71)$$

$$\frac{1}{R_1 + R_B}\cdot\cos\left(\frac{2\pi}{N}x - \frac{2\pi}{M}y\right)\cdot[G_{m,pk}R_S R_{F,LB} + K\cdot(R_1 + R_B + R_{F,MFB})]$$

While the noise of $R_B$ and baseband op-amps is anti-correlated at $V_{LB(x,y)}$ and $V_{MFB(x,y)}$, in some embodiments, the down-converted signals are actually correlated at these two nodes. In some embodiments, under the NC condition, the desired signals add up constructively; the receiver conversion gain becomes:

$$CG'_{RX,N-M} \equiv CG'_{LB,N-M} - K'_{NC,RB}\cdot CG'_{MFB,N-M} \quad (72)$$

$$= CG'_{LB,N-M}\cdot\left(1 + \frac{R_S}{2R_{SW} + 2\eta R_B}\right)$$

where, as expected, the expression is a function of $R_B$. When the input impedance is matched (i.e., $2R_{SW}+2\eta R_B=R_S$), the receiver conversion gain is twice the conversion gain of the modulated LNTA branches, in some embodiments.

Regarding the noise from $R_S$: Behaving similarly as signals, the noise of $R_S$ propagates to the outputs of the two signal branches creating correlated components, in some embodiments. In some embodiments, its noise contribution at $V_{CMB}$ is:

$$\frac{\overline{v_{no,R_S}^2}}{\Delta f} = \frac{\overline{v_{n,R_S}^2}}{\Delta f}\cdot\frac{2}{\text{sinc}^2(\pi/M)\cdot\text{sinc}^2(\pi/N)}\cdot \quad (73)$$

$$\left[\frac{2R_{SW} + 2\eta R_B}{R_S + 2R_{SW} + 2\eta R_B}\cdot CG'_{LB,N-M} - K\cdot CG'_{MFB,N-M}\right]^2$$

where the multiplication factor inside the bracket is the voltage division ratio between $R_S$ and $R_{in}$. Under the NC condition, (73) reduces to:

$$\frac{\overline{v_{no,R_S}^2}}{\Delta f} = \frac{\overline{v_{n,R_S}^2}}{\Delta f}\cdot CG'^2_{LB,N-M}\cdot\frac{2}{\text{sinc}^2(\pi/M)\cdot\text{sinc}^2(\pi/N)}. \quad (74)$$

The noise of $R_S$ is now not a function of input matching anymore, in some embodiments. Qualitatively, with large $R_{in}$, the noise at the LNTA branch outputs increases, whereas the noise at the mixer-first branches decreases, and vice versa for the case of small $R_{in}$, in some embodiments. In some embodiments, for both scenarios, the output noise due to $R_S$ stays constant.

Regarding the noise from $R_{SW}$: The noise transfer function of $R_{SW}$ is different from that of $R_S$, since its noise creates anti-correlated components at two branch outputs, in some embodiments. In some embodiments, its noise contribution at $V_{CMB}$ is given in as follows:

$$\frac{\overline{v_{no,R_{SW}}^2}}{\Delta f} = \quad (75)$$

$$2 \cdot \frac{\overline{v_{n,R_{SW}}^2}}{\Delta f} \cdot \left[ \frac{R_S \cdot CG'_{LB,N-M}}{R_S + 2R_{SW} + 2\eta R_B} + K \cdot \frac{(2R_{SW} + 2\eta R_B) \cdot CG'_{MFB,N-M}}{R_S + 2R_{SW} + 2\eta R_B} \right]^2 \cdot$$

$$\frac{2}{\text{sinc}^2(\pi/N) \cdot \text{sinc}^2(\pi/M)}$$

In some embodiments, under the NC condition, the noise of $R_{SW}$ gets cancelled, meaning that $\overline{v_{no,R_{SW}}^2}/\Delta f = 0$.

Regarding the Noise from $R_B$ and baseband op-amps: In some embodiments, the noise transfer functions of the (x, y)$^{th}$ path to $V_{CMB}(x,y)$ are derived above for both $R_B$ and the baseband op-amps. In some embodiments, here, the noise contribution at $V_{CMB}$ from $R_B$ in all the paths is derived as:

$$\frac{\overline{v_{no,R_B}^2}}{\Delta f} = \sum_{x=0}^{N/2-1} \sum_{y=0}^{M-1} \frac{\overline{v_{n,R_B}^2}}{\Delta f} \cdot \left| \frac{V_{CMB(x,y)}(\Delta\omega)}{V_{n,R_B}(\Delta\omega)} \right|^2 \quad (76)$$

$$= \frac{\overline{v_{n,R_B}^2}}{\Delta f} \cdot \frac{NM}{4} \cdot \left( \frac{G_{m,pk} R_S R_{F,LB} + K \cdot R_{F,MFB}}{R_1 + R_B} \right)^2$$

where its value reduces to zero under the NC condition. In some embodiments, the noise contribution at $V_{CMB}$ from all baseband op-amps in all the paths is:

$$\frac{\overline{v_{no,op}^2}}{\Delta f} = \sum_{x=0}^{N/2-1} \sum_{y=0}^{M-1} \frac{\overline{v_{n,op}^2}}{\Delta f} \cdot \left| \frac{V_{CMB,OP(x,y)}(\Delta\omega)}{V_{n,op}(\Delta\omega)} \right|^2 \quad (77)$$

$$= \frac{\overline{v_{n,op}^2}}{\Delta f} \cdot \frac{NM}{4} \cdot \left( \frac{G_{m,pk} R_S R_{F,LB} + K \cdot (R_1 + R_B + R_{F,MFB})}{R_1 + R_B} \right)^2$$

where, under the NC condition, its value reduces to:

$$\frac{\overline{v_{no,op}^2}}{\Delta f} = \frac{\overline{v_{n,op}^2}}{\Delta f} \cdot \frac{NM}{2} \cdot \left( CG'_{LB,N-M} \cdot \frac{R_S}{R_{MFB}} \right)^2 \cdot \frac{2}{\text{sinc}^2(\pi/N) \cdot \text{sinc}^2(\pi/M)} \quad (78)$$

where it can now be compared with the noise contribution due to the modulated LNTAs in (55). In some embodiments, using N=M=8, $F_{LO}$=700 MHz, $F_{IF}$=150 MHz, $R_S$=50Ω, $R_{SW}$=10Ω, $R_B$=1.06 kΩ, $R_{F,MFB}$=15 kΩ, $R_{F,LB}$=5 kΩ, and Gm,pk=90 mS, (55) can be calculated as 14.2 fV²/Hz, whereas (78) can be calculated as 0.6 fV²/Hz. The noise due to the baseband op-amps under the NC condition is then much smaller than the noise due to the modulated LNTAs and can be ignored, in some embodiments.

Regarding the noise factor of the double-conversion receiver: Since the noise due to the modulated LNTAs stays the same, in some embodiments, the noise factor of the complete receiver, $F_{RX,N-M}'$, is derived as follows:

$$F_{RX,N-M}' = \frac{1}{\text{sinc}^2(\pi/N) \cdot \text{sinc}^2(\pi/M)} \cdot \quad (79)$$

$$\left[ 1 + \frac{\gamma}{G_{m,pl} R_S} \cdot \frac{4}{M} \sum_{k=0}^{M/2-1} \left| \cos\left(\frac{2\pi}{M} k\right) \right| + \frac{\gamma}{G_{m,op} R_S} \cdot \frac{NM}{2} \cdot \left( \frac{R_S}{R_{F,MFB}} \right)^2 \right]$$

where the third term stems from the noise due to baseband op-amps and is much smaller than the noise due to the modulated LNTAs. In some embodiments, for N=M=8, (79) reduces to:

$$F_{RX,S-S}' \approx \frac{1}{\text{sinc}^4(\pi/8)} \cdot \left\{ 1 + \frac{2\gamma}{G_{m,pk} R_S} \cdot \left[ \frac{1}{2} + \cos\left(\frac{\pi}{4}\right) \right] \right\} \quad (80)$$

In some embodiments, similarly, the noise factor of the receiver, $F_{RX,S-S}''$, in a fully differential realization can be derived as:

$$F_{RX,S-S}'' \approx \frac{1}{\text{sinc}^4(\pi/8)} \cdot \left\{ 1 + \frac{2\gamma}{G_{m,pk} R_S} \cdot \left[ \frac{1}{2} + \cos\left(\frac{\pi}{4}\right) \right] \right\} \quad (81)$$

The tuned RF input interface offers attenuation to out-of-band (OB) blocking signals and reduces their voltage swings at the receiver's input (i.e., at the input of the quadrature-modulated LNTA branches) for better blocker tolerance, in some embodiments. In some embodiments, for OB frequencies, $R_{SW}$ dominates the input impedance; the attenuation of a single-ended-differential realization is:

$$ATTN = -20 \cdot \log_{10}\left( 2 \cdot \frac{2R_{SW}}{2R_{SW} + R_S} \right) \quad (82)$$

For $R_S$=50Ω and $R_{SW}$=5Ω, the attenuation is about 10 dB; the voltage swings at the receiver's input are three times smaller than that in a receiver with a broadband termination, in some embodiments. Thus, if the broadband-terminated receiver has a B1 dB of −10 dBm, the receiver with the tuned RF interface is expected to have a B1 dB of 0 dBm, in some embodiments. In some embodiments, for $R_{SW}$=10Ω, the attenuation reduces to only 5 dB and the B1 dB is improved to −5 dBm. Thus, it is highly desirable to have a small $R_{SW}$, while still maintaining the least amount of parasitic capacitance at the RF input, in some embodiments.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a receiver, comprising:
   N first mixers that each receive an input signal, that are each clocked by a different phase of a first common clock frequency, and that each provide an output, wherein N is a count of the first mixers; and
   for each of the N first mixers:
   a set of M second mixers, wherein M is a count of the second mixers in the set, wherein each second mixer in the set of M second mixers receives as an input the output of a same one of the N first mixers unique to the set, wherein each of the M second mixers in the set is clocked by a different phase of a second common clock frequency, and wherein each of the second mixers has an output;
   a set of M resistors having a first side and a second side, wherein the first side of each of the set of M resistors is: connected to the output of a corresponding one of the set of M second mixers; and not connected to the output of any other of the set of M second mixers; and a set of M trans-impedance amplifiers that each have an input connected to the second side of a corresponding one of the set of M resistors and having an output.

2. The circuit of claim 1, further comprising:
a plurality of low noise transconductance amplifier branches each comprising:
  a transconductor having an input connected to the input signal and a transconductor output signal;
  N third mixers that each receive a corresponding one of the transconductor output signals, that are each clocked by a different phase of the first common clock frequency, and that each provide a third mixer output signal; and
  N filters that each receive a corresponding on of the third mixer output signals and provide a filtered output signal.

3. The circuit of claim 2, wherein the transconductor comprises a plurality of transconductor unit cells that individually controllable.

4. The circuit of claim 3, wherein each of the plurality of low noise transconductance amplifier branches further comprises a direct digital synthesis circuit the controls the plurality of transconductor unit cells.

5. The circuit of claim 4, wherein the direct digital synthesis circuit comprises:
  a numerically controllable oscillator; and
  an accumulator.

6. The circuit of claim 1, further comprising a harmonic recombination circuit.

7. The circuit of claim 6, further comprising a sideband separation circuit.

8. The circuit of claim 1, wherein each of the first mixers is differential and clocked by two phases at the first common clock frequency each having a 12.5% duty cycle.

9. The circuit of claim 8, wherein each of the second mixers is differential and clocked by two phases at the second common clock frequency each having a 12.5% duty cycle.

10. The circuit of claim 1, further comprising, for each of the N first mixers, a set of M capacitors each having a first side and a second side, wherein, for each of the set of M capacitors, the first side of the capacitor is connected to the first side of a corresponding one of the set of M resistors and wherein the second side of the capacitor is connected to a voltage level.

11. A circuit for a receiver, comprising:
N first mixers that each receive an input signal, that are each clocked by a different phase of a first common clock frequency, and that each provide an output, wherein N is a count of the first mixers; and
for each of the N first mixers:
  a set of M second mixers, wherein M is a count of the second mixers in the set, wherein each second mixer in the set of M second mixers receives as an input the output of a same one of the N first mixers unique to the set, wherein each of the M second mixers in the set is clocked by a different phase of a second common clock frequency, and wherein each of the second mixers has an output;
  a set of M resistors having a first side and a second side, wherein the first side of each of the set of M resistors is connected to the output of a corresponding one of the set of M second mixers;
  a set of M capacitors each having a first side and a second side, wherein, for each of the set of M capacitors, the first side of the capacitor is connected to the first side of a corresponding one of the set of M resistors and wherein the second side of the capacitor is connected to a voltage level; and
  a set of M trans-impedance amplifiers that each have an input connected to the second side of a corresponding one of the set of M resistors and having an output.

12. The circuit of claim 11, further comprising:
a plurality of low noise transconductance amplifier branches each comprising:
  a transconductor having an input connected to the input signal and a transconductor output signal;
  N third mixers that each receive a corresponding one of the transconductor output signals, that are each clocked by a different phase of the first common clock frequency, and that each provide a third mixer output signal; and
  N filters that each receive a corresponding on of the third mixer output signals and provide a filtered output signal.

13. The circuit of claim 12, wherein the transconductor comprises a plurality of transconductor unit cells that individually controllable.

14. The circuit of claim 13, wherein each of the plurality of low noise transconductance amplifier branches further comprises a direct digital synthesis circuit the controls the plurality of transconductor unit cells.

15. The circuit of claim 14, wherein the direct digital synthesis circuit comprises:
  a numerically controllable oscillator; and
  an accumulator.

16. The circuit of claim 11, further comprising a harmonic recombination circuit.

17. The circuit of claim 16, further comprising a sideband separation circuit.

18. The circuit of claim 11, wherein each of the first mixers is differential and clocked by two phases at the first common clock frequency each having a 12.5% duty cycle.

19. The circuit of claim 18, wherein each of the second mixers is differential and clocked by two phases at the second common clock frequency each having a 12.5% duty cycle.

* * * * *